US008009629B2

(12) United States Patent
Aso

(10) Patent No.: US 8,009,629 B2
(45) Date of Patent: Aug. 30, 2011

(54) COMMUNICATION HANDOVER METHOD AND COMMUNICATION MESSAGE PROCESSING METHOD

(75) Inventor: Keigo Aso, Osaka (JP)

(73) Assignee: Panasonic Corporation, Osaka (JP)

( * ) Notice: Subject to any disclaimer, the term of this patent is extended or adjusted under 35 U.S.C. 154(b) by 1003 days.

(21) Appl. No.: 11/909,269

(22) PCT Filed: Mar. 30, 2006

(86) PCT No.: PCT/JP2006/306704
§ 371 (c)(1),
(2), (4) Date: Sep. 21, 2007

(87) PCT Pub. No.: WO2006/106846
PCT Pub. Date: Oct. 12, 2006

(65) Prior Publication Data
US 2009/0016298 A1    Jan. 15, 2009

(30) Foreign Application Priority Data

Mar. 30, 2005  (JP) ................................ 2005-097400

(51) Int. Cl.
*H04Q 7/00* (2006.01)
*H04W 36/00* (2009.01)
(52) U.S. Cl. ....................................... 370/331; 455/436
(58) Field of Classification Search .................. None
See application file for complete search history.

(56) References Cited

U.S. PATENT DOCUMENTS

| 7,349,364 | B2* | 3/2008 | Omae et al. | 370/328 |
| 7,835,324 | B2* | 11/2010 | Chowdhury et al. | 370/331 |
| 2002/0085517 | A1* | 7/2002 | Lee et al. | 370/331 |
| 2003/0225892 | A1* | 12/2003 | Takusagawa et al. | 709/227 |

(Continued)

FOREIGN PATENT DOCUMENTS

| JP | 2003-125433 | 4/2003 |
| JP | 2004-304841 | 10/2004 |

OTHER PUBLICATIONS

Yuan Bin et al., "IN2004-95 Kaisokei Mobile IPv6 ni yoru Multicast Packet Seigyo Hoshiki"., IEICE Technical Report, vol. 104, No. 340, Oct. 8, 2004 pp. 71-76.

(Continued)

*Primary Examiner* — Hassan Phillips
*Assistant Examiner* — Eunsook Choi
(74) *Attorney, Agent, or Firm* — Pearne & Gordon LLP

(57) ABSTRACT

A technique is disclosed whereby a mobile communication apparatus (MN) having a plurality of interfaces (IFs) performs fast handovers (FMIP) and changes a packet transfer destination using its own multiple IFs, so that packet transmission/reception using an appropriate IF for the MN is enabled. According to this technique, an MN 10 transmits, to an access router (AR) 21, an FBU message that includes, as an packet transfer destination used during a period in which the FMIP is performed for the handover from an access point (AP) 22 to an AP 32, an address that is allocated to an IF currently connected to the AP 12, and notifies the AR 21 to that effect. After the handover has been completed, the packet transfer destination is changed to the IF that is re-connected. Even when the handover for one IF is performed, the MN 10 can receive a packet using the IF having an address designated as a transfer destination, and further, when the handover has been completed, can perform communication using the IF designated before the FMIP was performed.

20 Claims, 14 Drawing Sheets

U.S. PATENT DOCUMENTS

| | | | |
|---|---|---|---|
| 2004/0264476 A1* | 12/2004 | Alarcon et al. | 370/395.52 |
| 2005/0083885 A1* | 4/2005 | Ikeda et al. | 370/331 |
| 2005/0083886 A1* | 4/2005 | Ikeda | 370/331 |
| 2005/0163080 A1* | 7/2005 | Suh et al. | 370/331 |
| 2006/0198370 A1* | 9/2006 | Haddad et al. | 370/389 |
| 2007/0109997 A1* | 5/2007 | Hong et al. | 370/331 |
| 2007/0204155 A1* | 8/2007 | Dutta et al. | 713/168 |
| 2009/0285184 A1* | 11/2009 | Watanabe et al. | 370/332 |

OTHER PUBLICATIONS

Search Report Dated Jun. 20, 2006.

Johnson, D.B, Perkins, C.E., and Arkko, J.; "Mobility Support in IPv6", RFC3775, Jun. 2004.

Rajeev Koodli; "Fast Handovers for Mobile IPv6", draft-ietf-mishop-fast-mipv6-03.txt, Oct. 25, 2004.

* cited by examiner

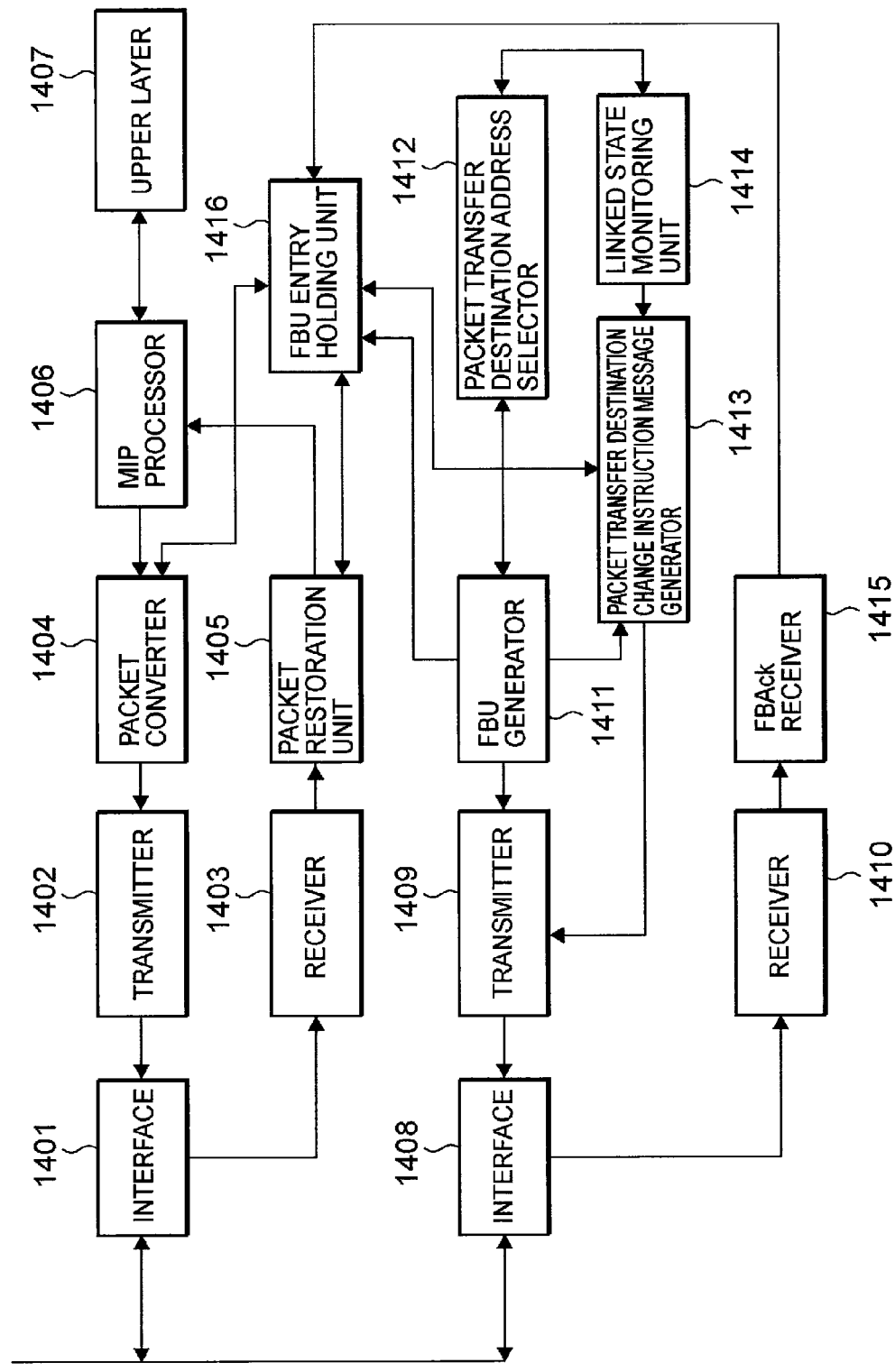

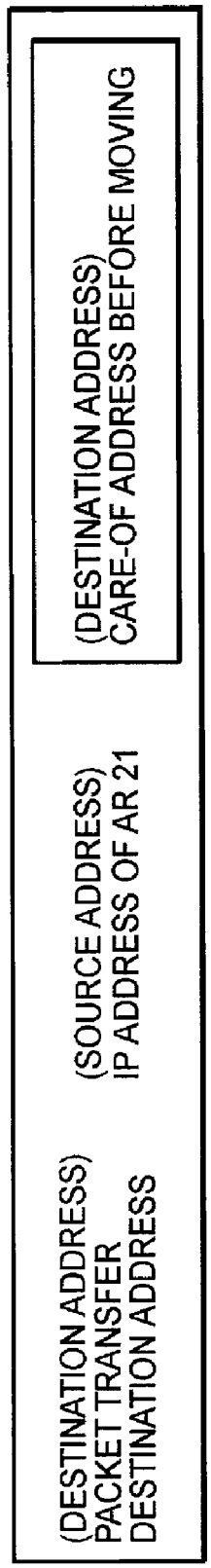
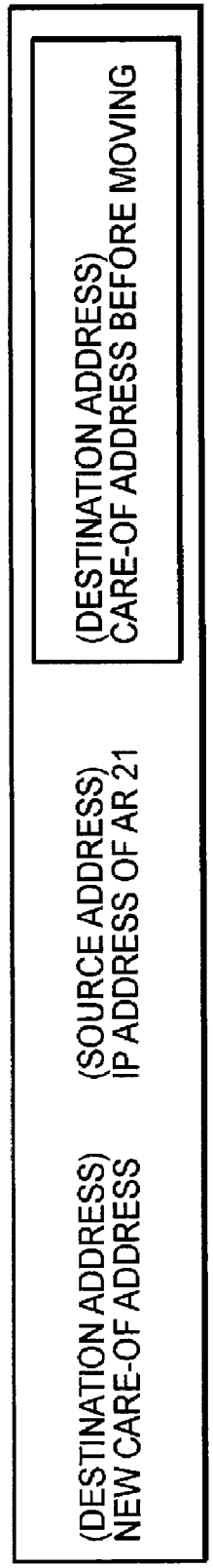

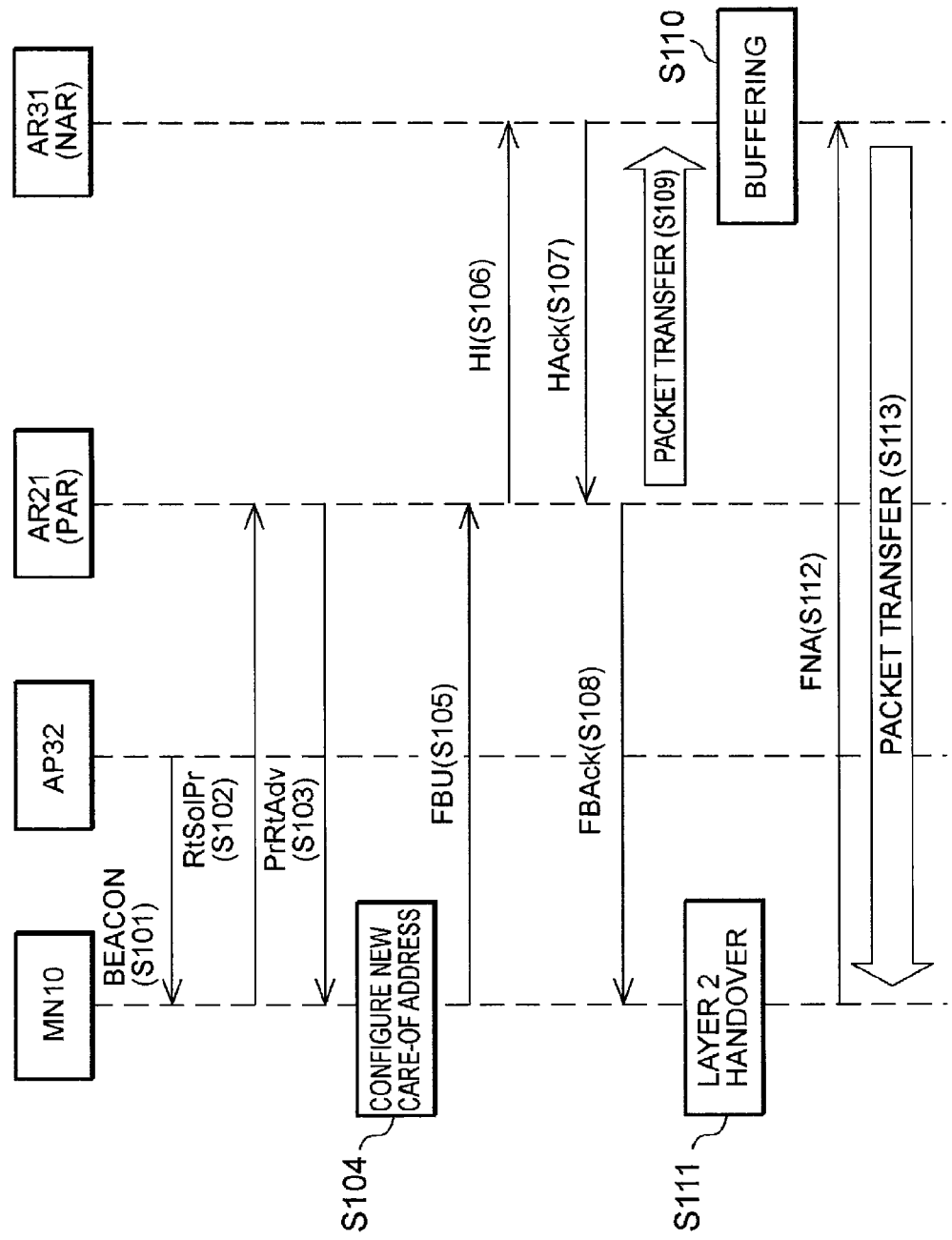

COMMUNICATION HANDOVER METHOD AND COMMUNICATION MESSAGE PROCESSING METHOD

TECHNICAL FIELD

The present invention relates to a communication handover method whereby, during a handover or upon completion of a handover for a mobile communication apparatus, such as a mobile node that has a plurality of connections to a higher network, an efficient communication environment can be provided for a user, and to a communication message processing method therefor.

BACKGROUND ART

First, a Mobile IP (hereinafter called an MIP) disclosed in non-patent document 1 will be described. MIP is a technique that enables a mobile communication apparatus (a Mobile Node: hereinafter called an MN) to attain movement transparency in a layer 3. According to the MIP, each MN has a home network, and employs, as a home address, a global address allocated on the home network. The home network is at least one network, or more, allocated for the MN that employs the MIP, and an assigned address on the home network is called a home address. When the MN is moved and the network to which the MN is to be connected is switched to a different network (hereinafter, called an external network), one other than the home network, the home address is still used as an address for a communication party (a Correspondent Node: hereinafter called a CN) to identify the MN on the Internet.

On the other hand, in a case wherein the MN is moved and the network to which the MN is to be connected is changed to an external network, the MN employs, as a Care-of Address (hereinafter may also be called a CoA), a global address assigned on the network. The care-of address is an address that the MN temporarily uses while on the network to which it has been moved. The MN employs a Binding Update message to register, with a home agent present on the home network of the MN, relative correlation information concerning the care-of address and the home address. The home agent function is to receive, as a proxy, a packet that has been forwarded to the home address of an MN that has registered a care-of address, and to transfer the packet to the care-of address that has been registered. Therefore, a CN that transmits a packet to the MN need not be aware that the MN is currently moving, and must merely transmit the packet, using the home address as the destination, for the packet to be properly delivered to the MN that is present on the external network.

When the MIP is employed in this manner, as well as in a case wherein the connection destination for the MN is an external network other than the home network, communication with the CN is enabled using the home address, as though a connection to the home network has been established. However, in a case wherein the MIP is employed, a problem encountered is that for a period, beginning with the disconnection of the MN from the network used prior to moving and continuing until the connection of the MN to the network at the movement destination and the re-enabling of communication using the home address, i.e., a period continuing until the transmission of the care-of address for the network at the movement destination has been completed, the MN can neither transmit nor receive packets. During this period, the home agent receives, as proxy, packets addressed to the home address of the MN; however, since the transfer destination is still the care-of address that was used on the network from which the MN was moved, the MN can not receive these packets, and as a result, the packets are abandoned. In order to resolve this problem that is encountered in a case wherein the MIP is employed, use of a technique called fast handovers for MIP (Fast Handovers for MobileIPv6: hereinafter called FMIP), which is described in non-patent document 2, is well known.

The FMIP technique will now be described by employing FIG. 14.

An access router (AR) 21, an access point (AP) 22 that is connected to the access router 21, an access router 31, and an access point 32 that is connected to the access router 31 are illustrated in FIG. 14. The access routers 21 and 31 are routers for managing subnets 23 and 34, which are subnetworks that include APs as subordinates, and for performing the routing, to an external network, of a packet transmitted by a node that is present on a subnetwork, and for the routing of a packet from the external network to a node in a subnetwork.

The AP 22 forms a radio coverage area 23, and the AP 32 forms a radio coverage area 33. By moving, an MN 10 can be connected, via the AP 22 or 32, to a subnetwork provided by the AR 21 or 31, and can also be connected to an IP network 15. The AR 21 and the AR 31 communicate with each other via the IP network 15. The connection and disconnection of an MN relative to the AP is performed under the control of a layer 2 (data link layer). In a case wherein the MN is present in the radio coverage area of the AP, the MN is connected to the AP on the layer 2, and thereafter communicates, via the layer 3, with the AR to which the AP is connected, so that the generation of an address and the setting of a default router are performed.

The operation of the FMIP will now be described by employing FIG. 14. Assume that an MN 10, in its initial state, is connected to the AP 22 and belongs to the subnet 24 formed by the AR 21. An explanation will be given for an operation in a case wherein the FMIP is performed when the MN 10, in this state, moves along a path from the radio coverage area 23 toward the AP 32, through an overlap area 25 between the radio coverage areas 23 and 33, and to the radio coverage area 33. It should be noted that hereafter there is a case wherein the AR 21, the access router before the MN 10 was moved, is called a PAR (a Previous Access Router), and the AR 31, which is the access router after the MN 10 has been moved, is called an NAR (a New Access Router).

A sequence applicable to when the MN performs the FMIP is shown in FIG. 15.

When the MN 10 has entered the overlap area 25, the MN 10 receives a beacon transmitted by the AP 32 (S101). And the identifier for the AP 32, included in the received beacon, is obtained and an RtSolPr (a Router Solicitation for Proxy Advertisement) message that includes this identifier is transmitted to the AR 21 (S102). Upon receiving this message, the AR 21 transmits to the MN 10 a PrRtAdv (Proxy Router Advertisement) message containing information for an AR (in this case, information for the AR 31) that has, as a subordinate, an AP that includes the identifier included in the message (S103).

When the handover to the AR 31 has been determined, the MN 10 employs the prefix for the AR 31, obtained through the PrRtAdv message, and configures a New Care-of Address (hereinafter, this may be called an NCoA) to be used at a destination (S104). Then, the configured, new care-of address is added to a Fast Binding Update message (hereinafter called an FBU message), and the FBU message is transmitted to the AR 21 (S105).

The AR 21 adds to a Handover Initiate message (hereinafter called an HI message), the new care-of address that is included in the FBU message, and transmits the HI message to the AR 31 (S106).

Upon receiving the HI message, the AR 31 determines whether the new care-of address included in the message is appropriate, adds the result to a Handover Acknowledgement message (hereinafter called an HAck message), and transmits this messages to the AR 21 (S107).

Upon receiving the HAck, the AR 21 adds to an FBAck message the examination result for the new care-of address that is included in the HAck message, and transmits the FBAck message to the MN 10 (S108). After the AR 21 has transmitted the FBAck message, the AR 21 receives, as a proxy, a packet that is delivered using the Previous Care-of Address (hereafter, may be called a PCoA) that the MN 10 used on the subnet 24, and transfers the packet to the new care-of address (S109).

The AR 31 performs buffering for the packet transmitted to the new care-of address of the MN 10 (S110).

When the MN 10 has performed the layer 2 handover and has been connected to the AP 32 (S111), the MN 10 transmits a Fast Neighbor Advertisement message (hereinafter called an FNA message) to the AR 31 (S112). Upon receiving the FNA message, the AR 31 transfers to the MN 10 the packet that is buffered at S110 (S113).

There are two operating modes for the FMIP: a case described above wherein, prior to the handover, the FBU message is transmitted and the FBAck message is received is called the predictive mode; and the other mode is called the reactive mode wherein, following the move, the FBU message is transmitted, via the AR 31, to the AR 21. When the FMIP is employed in this manner, the MN 10 can receive, without any loss, a packet that has been delivered during a period extending from the start of the layer 2 handover and continuing until the completion of the performance by the mobile IP at the destination. However, a problem here is that packet reception is stopped during the layer 2 handover. In a case, however, wherein the MN includes a plurality of interfaces, the above described problem can be solved.

An MN that includes a plurality of interfaces will now be briefly described. An MN having a plurality of interfaces can be a terminal that has two interfaces, such as a connection interface for a wireless LAN conforming to the IEEE802.11a/b/g and a cellular connection interface for W-CDMA, UMTS, etc. Currently, such a terminal has already appeared on the market, and its use will spread, as a more common item in the future.

The merit involved in including both a wireless LAN interface and a cellular interface is that the area covered by the cellular network is broader than the area covered by the wireless LAN. Thus, when the MN is moved outside the coverage area of the wireless LAN, or has performed a handover to the connection point of a different wireless LAN, a case will probably occur wherein the cellular interface will always be present in the coverage area of the cellar network.

Further, not only for a mode wherein a wireless LAN interface and a cellar interface are included but also for a case wherein interfaces for various other connection methods are employed, a case could occur wherein, when one of the interfaces is moved outside a coverage area or when a handover is performed, the other interface will be present in the coverage area and a connection will be continued. Furthermore, since a wireless LAN has a broader band than has a cellar network, and since the access fee will be less expensive, it is assumed that users will request to use the wireless LAN in preference to the cellar network.

Even when an accompanying situation involving the disconnection or interruption of a connection occurs, i.e., when one of a plurality of interfaces included in the MN falls outside the coverage area, or the handover is performed, the other interface will acquire a continuous connection state. In this state, the FMIP is performed for the interface moved outside the coverage area, or for the connection of the interface that performs the handover, so that regardless of whether there is a disconnection or an interruption of the interface, packets can be continuously received. This method is the one whereby the MN employs, as a new care-of address to be transmitted with a FBU message, an address assigned to the other interface that is currently connected.

As a result, when the PAR has encapsulated a packet and has transferred it to the care-of address indicated in the FBU message, the MN can receive the packet of this address through the interface that is currently connected, so that buffering performed by the MAR is not required. That is, even when one of the interfaces is currently performing a layer 2 handover, a packet delivered during this period can be received using the other interface.

Non-Patent Document 1: Johnson, D. B., Perkins, C. E., and Arkko, J., "Mobility Support in IPv6", RFC3775, June 2004.

Non-Patent Document 2: Rajeev Koodli, "Fast Handover for Mobile IPv6", draft-ietf-mipshop-fast-mipv6-03.txt, Oct. 25, 2004.

However, as described above, in a case wherein an MN having a plurality of interfaces employs the normal FMIP and uses, as a new care-of address, the address of a different interface to which currently connected, an AR used before moving (a Previous Access Router; hereafter called a PAR) will not be aware that the address indicated in the notification is the address of the different interface of the mobile node that is currently connected. Therefore, in the normal FMIP process, a packet delivered to the PCoA is continuously transferred to the NCoA until the entry held by the PAR is timed-out. That is, the MN has merely changed the interface to be used, and the state of the interface that is performing the handover is not considered at all.

Therefore, when the above described method is employed for a case wherein the cellular interface is the one that the mobile node transmitted to the PAR as a new care-of address, and wherein the wireless LAN interface is the one via which the handover is actually currently being performed, the packet transfer destination continues to be the cellular interface even when the handover using the wireless LAN has been completed. That is, the mobile node can not effectively employ the WLAN interface, for which the handover has been completed and the broadband connection means has been obtained.

Furthermore, not only in the above described case involving the use of the wireless LAN and the cellar interfaces, but also in a case involving the use of various connection modes, the current FMIP does not consider the fact that the interface for which the handover has been completed is to be employed again, while taking into account, for example, the communication quality state, the cost and the communication speed.

In addition, as the common FMIP process for permitting the NAR to confirm whether a new care-of address transmitted by the MN is appropriate, the PAR transmits an HI message, and receives an HAck message as a reply. Generally, the NAR for the FMIP is an access router that is present in a subnet at a new connection destination for the interface of the MN that performs a handover. However, in a case wherein, as described above, the MN transmits an FBU message by employing, as a new care-of address, an address that is allocated to a different interface to which currently connected, the PAR identifies, as the NAR, the access router that is present in the subnet for which the address is valid.

However, for the PAR, there is no guarantee that the NAR is an access router present in the neighborhood, and it is highly probable that the NAR of the MN will not be included in information for the AR available for the PAR. In this case, a phenomenon that hinders the performance of the FMIP could occur, e.g., the PAR could not know the destination address of an HI message, or even if the destination address is found, the PAR could not receive an HAck message because the access router is not compatible with the FMIP.

DISCLOSURE OF THE INVENTION

To resolve the above described problems, one objective of the present invention is to provide a communication handover method whereby an FMIP process can be smoothly performed, even in a case wherein a mobile node having a plurality of interfaces performs the FMIP by employing, as a packet transfer destination address, the address of an interface to which currently connected, and whereby, when the connection of the interface using the handover has been completed, the transfer destination could be changed to this interface and a communication message processing method.

In order to resolve the problems, the present invention is a communication handover method, which is to be performed when, in a communication system wherein a first access router, which belongs to a first subnet, a second access router, which belongs to a second subnet that is different from the first subnet, and a third access router, which belongs to a third subnet that is different from the first and the second subnets, are connected via an IP network, a mobile terminal, which has a plurality of interfaces and which is connected, via radio communication, to the first subnet using a first interface and is connected to the third subnet using a second interface, switches a connection from the first subnet to the second subnet, comprising the steps of:

the mobile terminal transmitting, to the first access router, an FBU message that includes not only address information to be used on the first subnet but also packet transfer destination address information allocated for the second interface;

the first access router transmitting, to the second access router, a packet transfer destination address notification message that includes the packet transfer destination address information that is included in the FBU message;

the second access router storing the packet transfer destination address information for the mobile terminal that is included in the packet transfer destination address notification message;

the first access router receiving, as a proxy, a packet addressed to the first subnet of the mobile terminal, and encapsulating the packet and transmitting the encapsulated packet to an address to be used on the second subnet of the mobile terminal;

the second access router receiving, as a proxy, the encapsulated packet that is transmitted by the first access router to the address to be used on the second subnet of the mobile terminal, and encapsulating the packet and transmitting the encapsulated packet to a packet transfer destination address of the mobile terminal;

the mobile terminal receiving, via the second interface, the encapsulated packet that is transmitted by the second access router to the packet transfer destination address of the mobile terminal;

when a connection to the second access router using the first interface has been completed, the mobile terminal transmitting a packet transfer halt instruction message to request that packet transfers to the second access router be halted; and upon receiving the packet transfer halt instruction message, the second access router halting encapsulation and transmission to the packet transfer destination address of the mobile terminal.

Further, in order to resolve the above described problems, the present invention is a communication handover method, which is to be performed when, in a communication system wherein a first access router, which belongs to a first subnet, a second access router, which belongs to a second subnet that is different from the first subnet, and a third access router, which belongs to a third subnet that is different from the first and the second subnets, are connected via an IP network, a mobile terminal, which has a plurality of interfaces and which is connected, via radio communication, to the first subnet using a first interface and is connected to the third subnet using a second interface, switches a connection from the first subnet to the second subnet, comprising the steps of:

the mobile terminal transmitting, to the first access router, an FBU message that includes not only address information to be used on the first subnet, but also packet transfer destination address information allocated for the second interface;

the first access router storing the packet transfer destination address information for the mobile terminal that is included in the FBU message;

the first access router transmitting, to the mobile terminal, an FBAck message indicating that an address to be used on the second subnet is valid;

the first access router receiving, as a proxy, a packet transmitted to an address on the first subnet of the mobile terminal, and encapsulating the received packet and transmitting the encapsulated packet to the packet transfer destination address of the mobile terminal;

the mobile terminal receiving, via the second interface, the encapsulated packet that has been transmitted by the first access router to the packet transfer destination address of the mobile terminal;

when a connection to the second access router using the first interface is completed, the mobile terminal transmitting, to the first access router, a packet transfer destination change instruction message requesting that the packet transfer destination be changed to an address used on the second subnet; and upon receiving the packet transfer destination change instruction message, the first access router changing the packet transfer destination of the mobile terminal for encapsulation to the address that the mobile terminal uses on the second subnet.

Furthermore, in order to resolve the above problems, the present invention is a communication handover method, which is to be performed when, in a communication system wherein a first access router, which belongs to a first subnet, a second access router, which belongs to a second subnet that is different from the first subnet, and a third access router, which belongs to a third subnet that is different from the first and the second subnets, are connected via an IP network, a mobile terminal, which has a plurality of interfaces and which is connected, via radio communication, to the first subnet using a first interface and is connected to the third subnet using a second interface, switches a connection from the first subnet to the second subnet, comprising the steps of:

the mobile terminal transmitting to the first access router an FBU message that includes packet transfer destination address information, allocated for the second interface, and information indicating that the packet transfer destination address information is for an address allocated to an interface that is currently connected;

the first access router storing the packet transfer destination address information for the mobile terminal that is included in the FBU message;

the first access router receiving, as a proxy, a packet transmitted to an address on the first subnet of the mobile terminal, encapsulating the received packet and transmitting the encapsulated packet to the packet transfer destination address of the mobile terminal; and the mobile terminal receiving, via the second interface, the encapsulated packet that has been transmitted by the first access router to the packet transfer destination address of the mobile terminal.

The present invention provides such effects that, even in a case wherein a mobile terminal, having a plurality of interfaces, employs the FMIP and performs handovers between the access routers, and uses, as a packet transfer destination address, the address of a different interface that is currently connected, after the handover has been completed, the mobile terminal can receive a transferred packet using this interface.

BRIEF DESCRIPTION OF THE DRAWINGS

FIG. 7 A block diagram illustrating the arrangement of a mobile communication apparatus MN 10 according to the second embodiment of the present invention;

FIG. 10A A schematic diagram illustrating a first structure of a data packet, for the second embodiment of the present invention, that the AR 21 transfers to the MN 10;

FIG. 10B A schematic diagram illustrating a second structure of a data packet, for the second embodiment of the present invention, that the AR 21 transfers to the MN 10;

FIG. 15 A sequence chart illustrating the main processing performed by the conventional radio communication system.

BEST MODES FOR CARRYING OUT THE INVENTION

Figure 1:
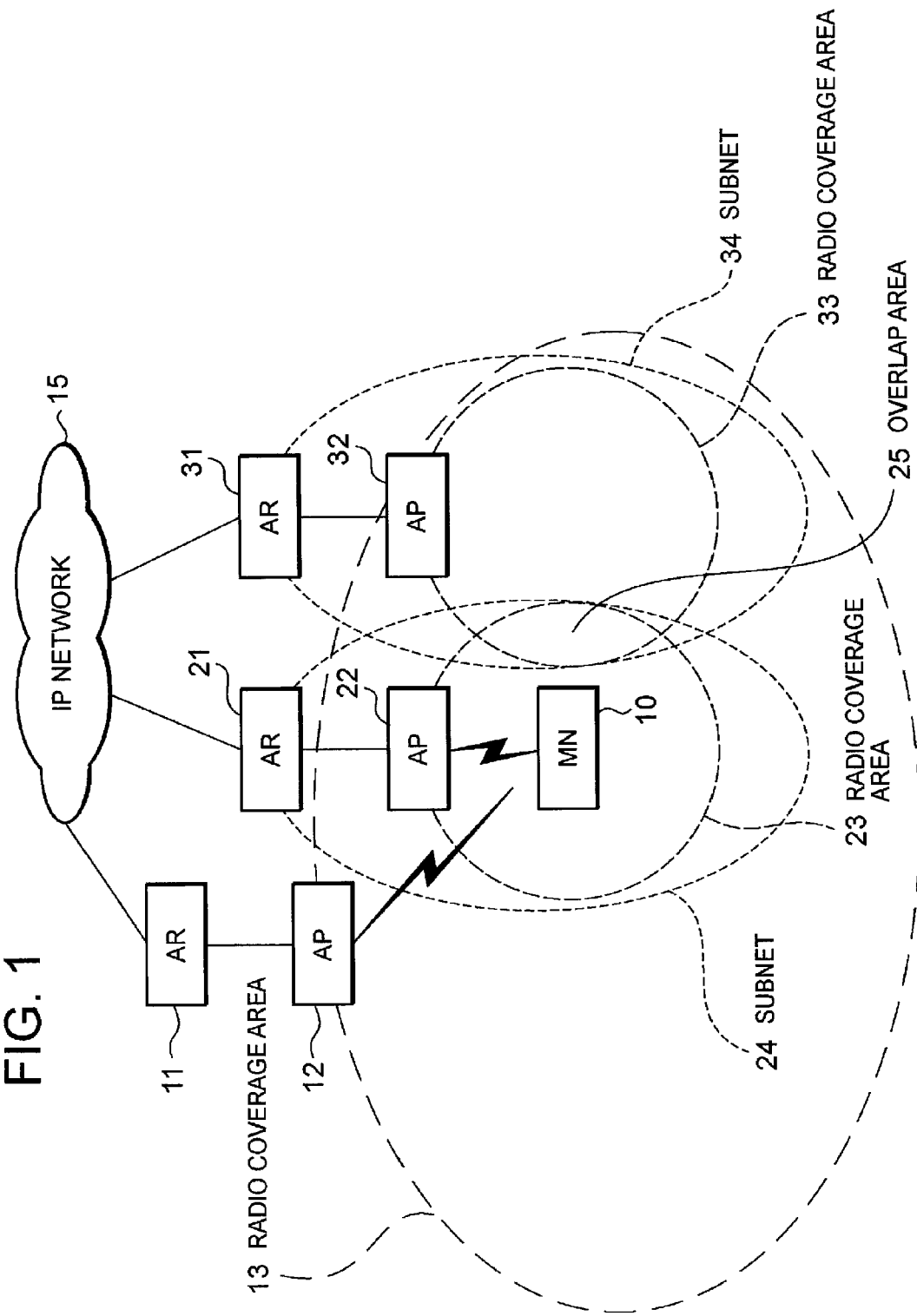
FIG. 1 A schematic diagram illustrating the configuration of a radio communication system according to the first embodiment of the present invention.

In the present invention, before an MN employs the FMIP and performs a handover between access routers that are connected to an IP network, the MN transmits, to an access router used before moving, an FBU message that includes an address to be used as a packet transfer destination, an address allocated to a different interface of the MN that is currently connected, and notifies the PAR of the above described effect. Furthermore, when a connection of the interface used for the handover is completed, the packet transfer destination is changed to an address allocated to the interface that is again connected. Therefore, during a period in which the interface for the handover is disconnected, packet reception is enabled by using an interface having an address that is designated as a transfer destination. Further, after the connection of the interface via which the handover was performed has been completed, communication is enabled using the same interface as before the FMIP was performed.

The embodiments of the present invention will now be described while referring to the drawings.

First Embodiment

Figure 14:
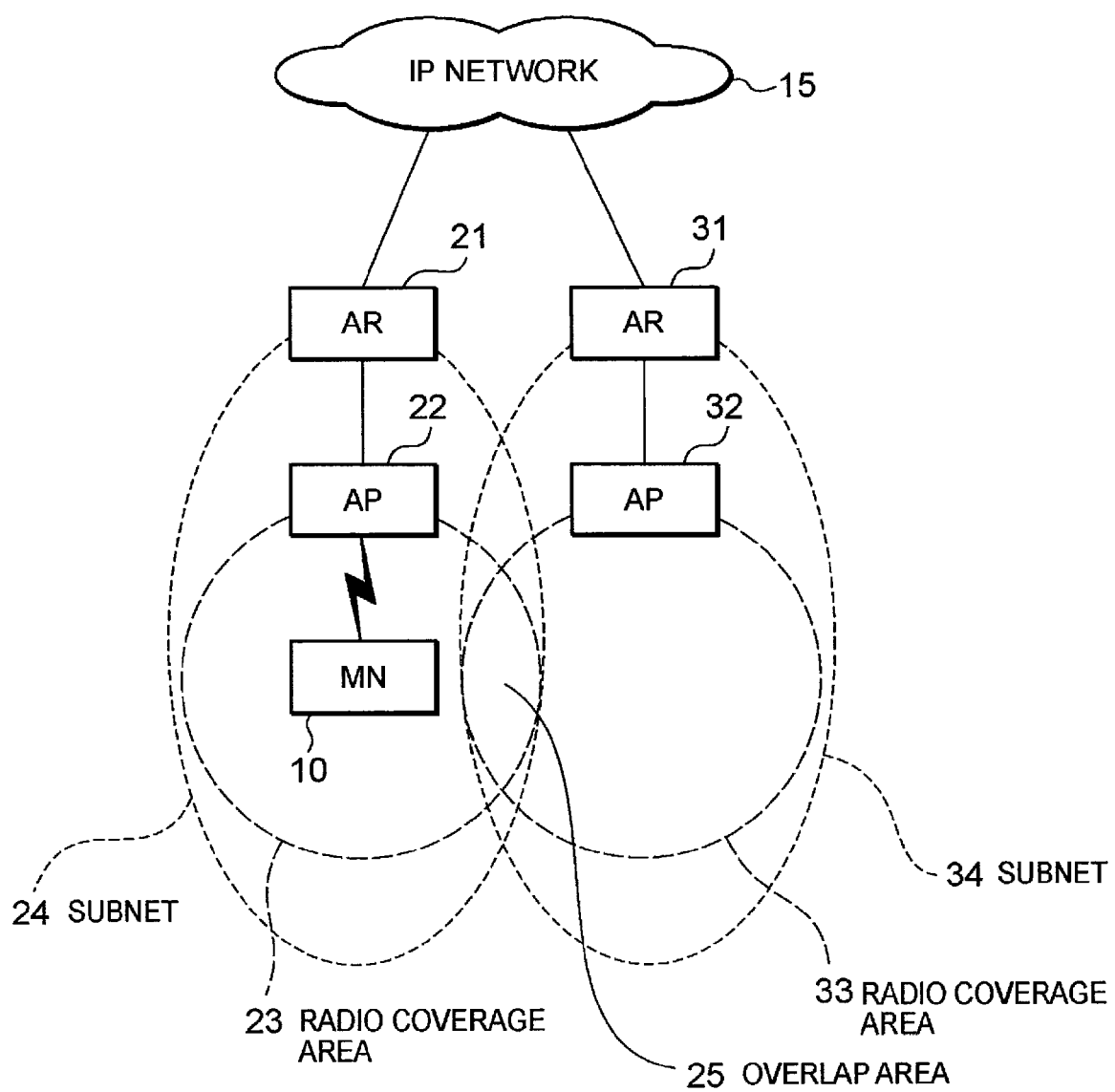
FIG. 14 A schematic diagram illustrating the configuration of a conventional radio communication system.

First, the first embodiment of the present invention will be described. The configuration of a radio communication system according to the present invention is shown in FIG. 1. The numbers used for the components in the radio communication system in FIG. 14 are also employed for the corresponding components shown in FIG. 1, and no further explanation for them will be given. While referring to FIG. 1, an AR 11, an AP 12 and a radio coverage area 13 are additionally shown. The AR 11 is a router that is connected to an IP network 15, and manages subnets included in the radio coverage area 13 of the subordinate AP 12. An MN 10 in this embodiment has a plurality of interfaces, and assuming a case that, in a state wherein one of the interfaces is connected to the AP 12 to enable communication with the IP network 15 via the AR 11, and one of the other interfaces is connected to the AP 22 to enable communication with the IP network 15, via the AR 21, the MN 10 moves from a radio coverage area 23 through an overlap area 25 to a radio coverage area 33.

It should be noted that the connection arrangement of the MN, the AR and the AP is not limited to the system configuration shown in FIG. 1, and a different arrangement may be employed, so long as the present invention can be performed.

Figure 2:
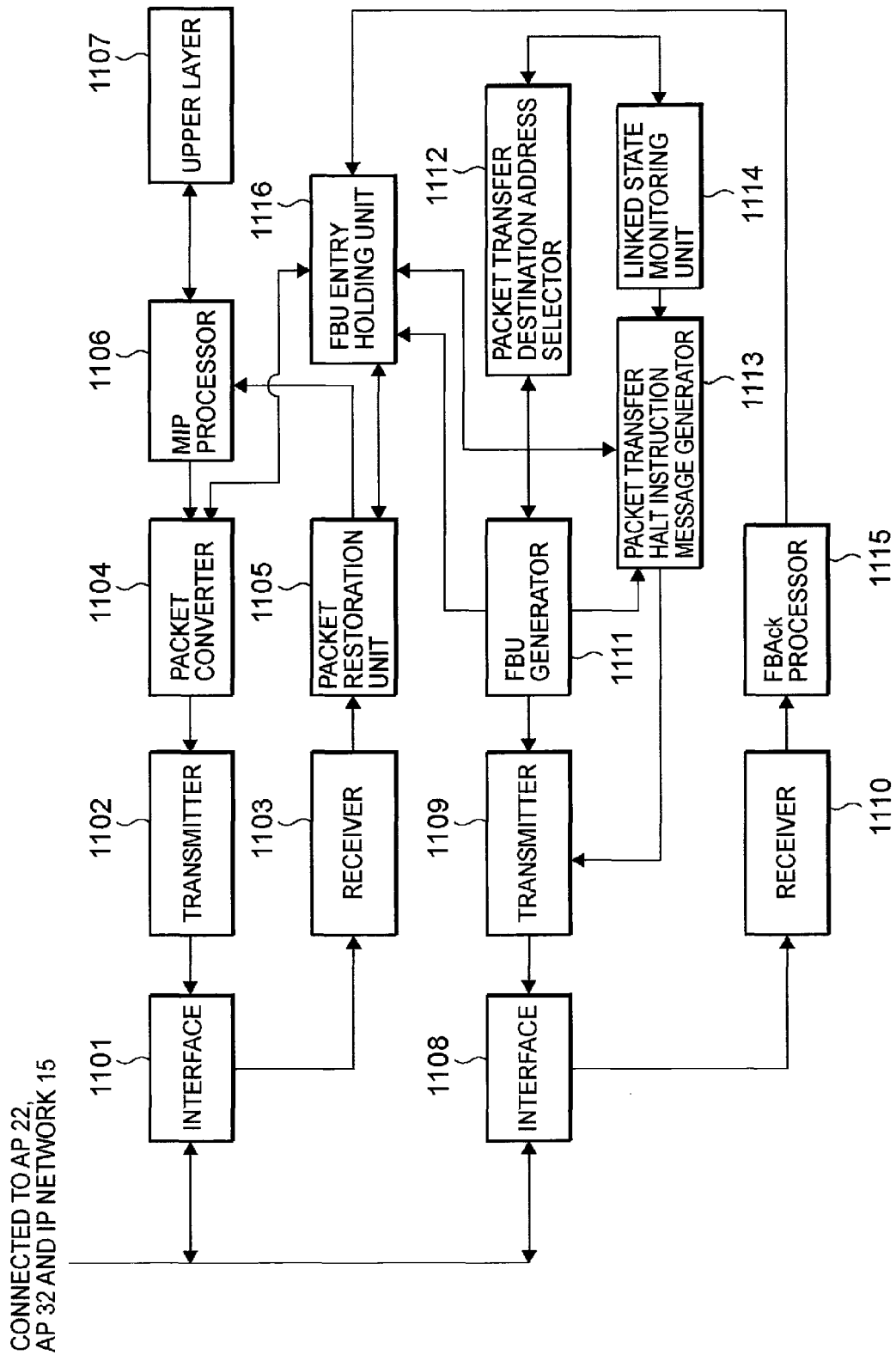
FIG. 2 A block diagram illustrating the arrangement of a mobile communication apparatus MN 10 according to the first embodiment of the present invention.

FIG. 2 is a block diagram illustrating an example arrangement for the MN according to the present invention. The MN shown in FIG. 2 includes two interfaces (an interface 1 and an interface 2); however, the number of interfaces held by MNs related to the present invention is not limited to two, and many more interfaces may be included. In FIG. 2, only the interfaces related to the present invention are shown, and it is assumed that an interface 1101 is connected to the AP 12 in FIG. 1, while an interface 1108 is connected to the AP 22 in FIG. 1.

The MN 10 in FIG. 2 includes: the interface 1101 connected to the IP network 15, a transmitter 1102, a receiver 1103, a packet converter 1104, a packet restoration unit 1105, an MIP processor 1106, an upper layer 1107, the interface 1108, a transmitter 1109, a receiver 1110, an FBU generator 1111, a packet transfer destination address selector 1112, a packet transfer halt instruction message generator 1113, a linked state monitoring unit 1114, an FBAck processor 1115 and an FBU entry holding unit 1116.

The interface 1101 and the interface 1108 can be connected to the IP network 15 via the AP 12, the AP 22 and the AP 32. The transmitter 1102 and the receiver 1103 employ the interface 1101 to transmit and receive packets. Furthermore, the transmitter 1109 and the receiver 1110 employ the interface 1108 to transmit and receive packets.

Based on information (e.g., the address of an access router at a connection destination) related to an already transmitted FBU that is held by the FBU entry holding unit 1116, the packet converter 1104 encapsulates, for the PAR, a packet received from the MIP processor 1106, then, encapsulates this packet for the NAR and transmits the encapsulated packet to the transmitter 1102.

The MIP processor 1106 employs the MobileIP information to convert the transmission packet received from the upper layer 1107, and transmits the obtained packet to the packet converter 1104. The upper layer 1107 corresponds to a layer further upward than the IP layer, and includes a TCP layer, a UDP layer or an application layer. Based on information related to the already transmitted FBU, which is held in the FBU entry holding unit 1116, the packet restoration unit 1105 decapsulates a received packet that is transmitted by the receiver 1103, and transmits the decapsulated packet to the MIP processor 1106.

The FBU generator 1111 generates an FBU message that includes: a new care-of address that is to be used on the subnet 34 at a handover destination; and a packet transfer destination address that has been transmitted by the packet transfer destination address selector 1112, and transmits the FBU message to the transmitter 1109 to request the transmission of this message to the AR 21. Furthermore, the FBU generator 1111 requests that the FBU entry holding unit 1116 store information included in the transmitted FBU message. It should be noted that, in order to identify the address included in the FBU message as either a new care-of address or a packet transfer destination address, the address may be represented using a difference in the types of options that include these addresses, or by using a difference in the fields in the same option. For example, an Alternate CoA Option, which is one of the mobility options, can be employed to represent a new care-of address, and a mobility option for a new type can be employed to represent a transfer destination address.

The packet transfer destination address selector 1112 selects, as an appropriate packet transfer destination, one interface from the list of currently connected interfaces that is obtained from the linked state monitoring unit 1114, and transmits to the FBU generator 1111 an address allocated for the selected interface.

The linked state monitoring unit 1114 monitors the states of a plurality of interfaces held by the MN 10, and upon receiving a request from the packet transfer destination address selector 1112, transmits, as a reply, information that includes the states of the individual interfaces.

When the packet transfer halt instruction message generator 1113 is aware, based on the information received from the linked state monitoring unit 1114, that a connection to the subnet 34 at the moving destination has been completed for the interface, for which the handover was performed using the FMIP, the packet transfer halt instruction message generator 1113 generates a packet transfer halt instruction message based on information held by the FBU entry holding unit 1116, requesting the halting of packet transfers by the AR 31, and transmits this message to the transmitter 1109 to instruct the transmission of the message to the AR 31.

The FBAck processor 1115 processes an FBAck message received by the receiver 1110, obtains the reception result, included in the message, concerning the previously transmitted FBU message, and transmits the result to the FBU entry holding unit 1116.

The FBU entry holding unit 1116 stores the information transmitted by the FBU generator 111, and further employs the FBU reception result, received from the FBAck processor 1115, to determine whether the entry should be continuously held.

Figure 3:
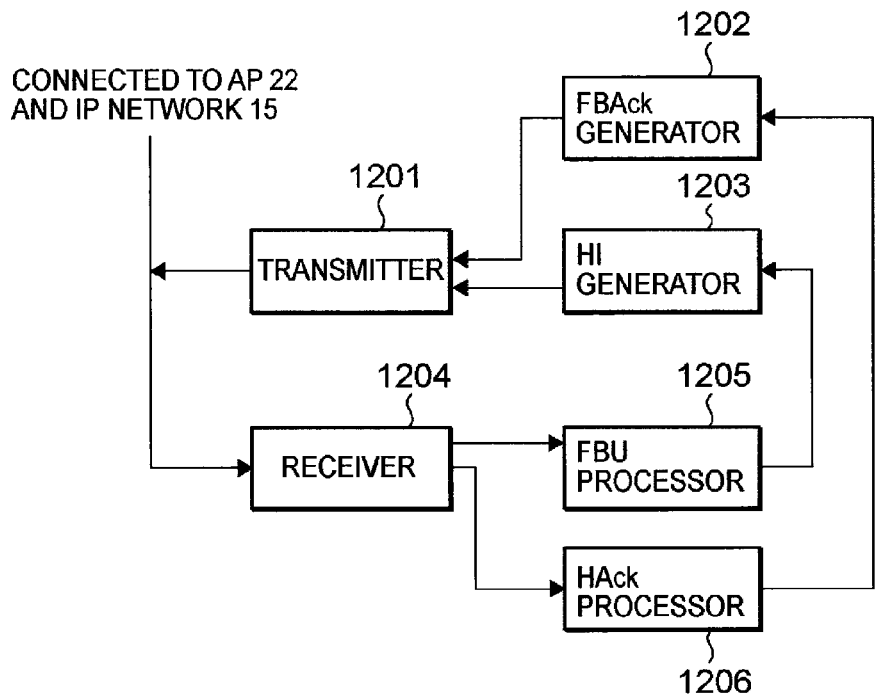
FIG. 3 A block diagram illustrating the arrangement of an access router AR 21 according to the first embodiment of the present invention.

FIG. 3 is a block diagram showing an example arrangement for the AR 21 of the present invention. A transmitter 1201 and a receiver 1204 are connected to the subordinate AP 22 and the IP network 15 to transmit and receive packets. It should be noted that, generally, an interface to be connected to the AP 22 differs from an interface to be connected to the IP network 15, and a plurality of transmitters and receivers are provided in consonance with the individual interfaces. However, those are collectively shown as one transmitter 1201 and one receiver 1204.

An FBAck generator 1202 receives an instruction from an HAck processor 1206, and generates an FBAck message to be transmitted to the MN 10. The FBAck message includes the status of an NAR transmitted by the HAck processor 1206.

An HI generator 1203 receives an instruction from an FBU processor 1205 and generates an HI message that includes a new care-of address and a packet transfer destination address, which are obtained from the FBU message, and a request to the transmitter 1201 for the transmission of this message to the AR 31.

The FBU processor 1205 performs a process related to the FBU message that the receiver 1204 has received from the MN 10, transmits to the HI generator 1203 information, such as a new care-of address or a transfer destination address, that is included in the FBU message, and requests the generation of an HI message.

The HAck processor 1206 performs a process related to the HAck message that the receiver 1204 has received from the AR 31, transmits to the FBAck generator 1202 the status of the NAR that is included in the HAck message, and requests the generation of an FBAck message and the transmission of this message to the MN 10.

Figure 4:
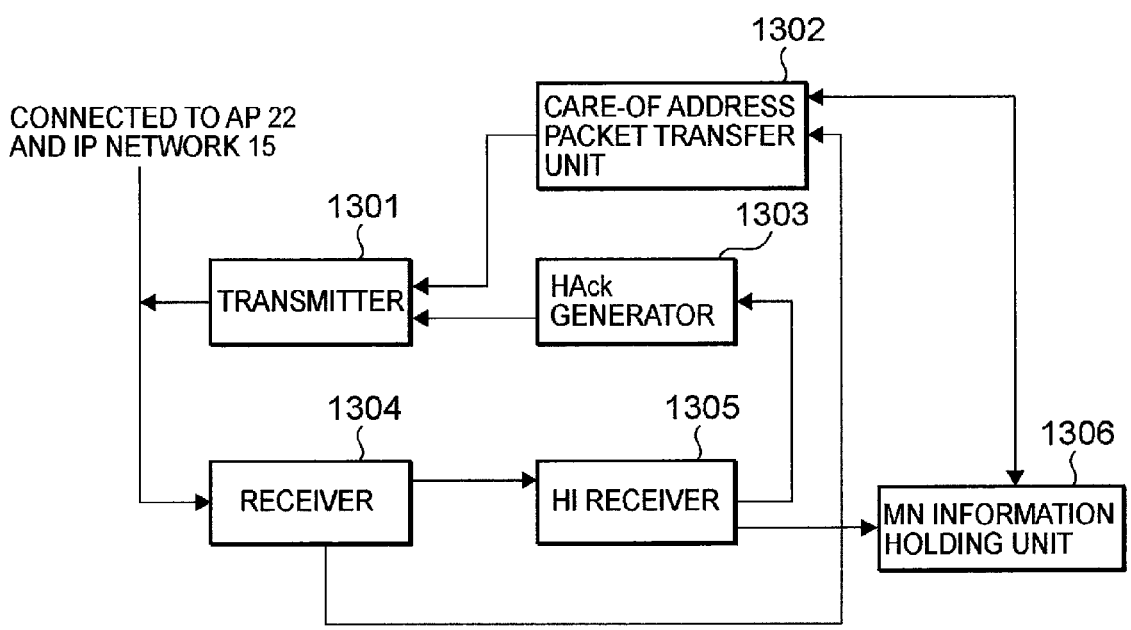
FIG. 4 A block diagram illustrating an access router AR 31 according to the first embodiment of the present invention.

FIG. 4 is a block diagram illustrating an example arrangement for the AR 31 of the present invention. A transmitter 1301 and a receiver 1304 are connected to the subordinate AP 32 and the IP network 15 for transmitting and receiving packets. It should be noted that, generally, an interface to be connected to the AP 32 differs from an interface to be connected to the IP network 15, and that a plurality of transmitters and receivers are provided in consonance with the individual interfaces. However, all these are collectively shown as one transmitter 1301 and one receiver 1304.

A care-of address packet transfer unit 1302 encapsulates a packet for a new care-of address for the MN 10, received by the receiver 1304, while employing as a destination a packet transfer destination address obtained by the MN information holding unit 1306, and transmits the encapsulated packet to the transmitter 1301 to instruct its transmission.

The HAck generator 1303 receives an instruction from an HI receiver 1305, and generates an HAck message that includes appropriateness investigation results for a new care-of address for the MN 10 and information indicating there has been a packet transfer halt instruction request response.

The MN information holding unit 1306 stores the MN information (a new care-of address, a packet transfer destination address, etc.) obtained by the HI receiver 1305. Furthermore, although not shown, the AR 31 includes a packet transfer halt instruction message receiver, and when a packet transfer halt instruction message is received from the MN 10, the AR 31 issues an instruction to the care-of address packet transfer unit 1302 to halt proxy reception pertinent to this message. Since the proxy reception of a packet for a new care-of address for the MN 10 is not performed following the reception process performed for this message, the normal routing process is performed for the packet for the new care-of address.

Figure 5:
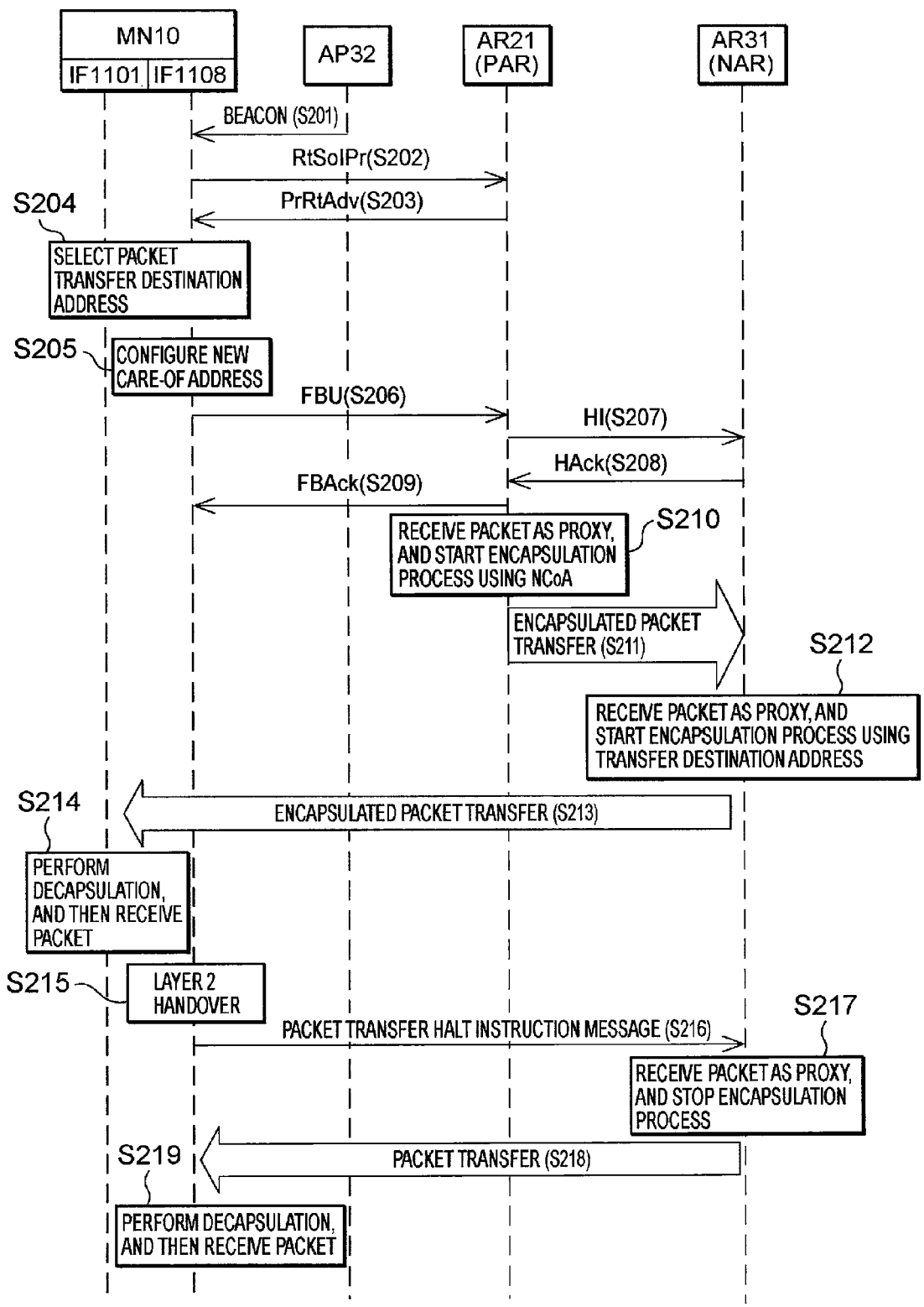
FIG. 5 A sequence chart illustrating the main processing performed by the radio communication system according to the first embodiment of the present invention.

FIG. 5 is a sequence chart showing the main processing performed by the radio communication system of the present invention. Since the process from when the MN 10 receives a beacon from the AP 32 (S201) and transmits an RtSolPr message (S202) until the MN receives a PrRtAdv message (S203) is the same as the normal FMIP process, no further explanation will be given.

When a handover to the AR 31 is determined, the MN 10 selects, as an appropriate packet transfer destination, one interface (in this case, the interface 1101) from among a plurality of interfaces that are included in the MN 10 and that are in the currently connected state to enable the transmission/reception of packets, and selects, as a packet transfer destination address, an address allocated for the selected interface (S204). Furthermore, a new care-of address is configured by using the prefix of the AR 31 obtained at S203 (S205). Then, an FBU message is generated that includes the selected packet transfer destination address and the selected new care-of address and is transmitted to the AR 21 (S206).

Upon receiving the FBU message, the AR 21 transmits to the AR 31 an HI message that additionally includes the new care-of message and the packet transfer address that were included in the received message (S207).

Upon receiving the HI message, the AR 31 transmits to the AR 21 an HAck message that additionally includes: results obtained by investigating the appropriateness of the new care-of address included in the message; and information indicating the AR 31 is compatible with the changed packet transfer destination (S208).

Upon receiving the HAck message, the AR 21 generates an FBAck message by adding, to the common FMIP FBAck message, the information that is transmitted using the HAck message and that indicates the AR 31 is compatible with the change of the packet transfer destination, and transmits the FBAck message to the MN 10 (S209). After the FBAck has been transmitted, the AR 21 receives, as a proxy, a packet transmitted for the care-of address used before the MN 10 was moved, and begins an encapsulation process for a packet by employing a new care-of address NCoA for the MN 10 (S210). Then, the encapsulated packet is transmitted (S211).

The AR 31 receives, as a proxy, a packet that has been transferred for the new care-of address of the MN 10 by the AR 21, and starts an encapsulation process for the packet by employing the transfer destination address of the MN 10 (S212). It should be noted that, for the encapsulation performed here, the outer header for the NCoA may be removed, and then, the packet may be either be encapsulated using the transfer destination address, or the packet for the NCoA may be further encapsulated using the transfer destination address. Thereafter, the obtained encapsulated packet is transmitted to the MN 10 (S213).

The MN 10 receives, via the interface 1101, a packet that is transmitted for the packet transfer destination address by the AR 31, and decapsulates the packet to receive the internal packet (S214). During this process, in consonance with the encapsulation method at S212, either a packet for the transfer destination address is decapsulated to receive a packet for the PCoA, or a packet for the transfer destination address is decapsulated and the packet for the NCoA, obtained by decapsulation, is further decapsulated to receive the packet for the PCoA.

On the other hand, after the layer 2 handover has been performed using the interface 1108 of the MN 10 (S215), a packet transfer halt instruction message is transmitted to the AR 31, at a connection destination, requesting the halting of the transfer of packets for the packet transfer destination address (S216).

Upon receiving the packet transfer halting instruction message from the MN 10, the AR 31 halts the packet proxy reception and encapsulation process, and as well as for other packets, starts the normal routing process for packets for the new care-of address NCoA of the MN 10 (S217). In this manner, packets for the new care-of address can be transferred to the MN 10 (S218).

The MN 10 receives, via the interface 1108, a packet for the new care-of address that is transmitted by the AR 31, decapsulates the packet, and receives the internal packet (S219).

Figure 6A:
FIG. 6A A schematic diagram illustrating a first structure of a data packet, for the first embodiment of the present invention, that the AR 31 transfers to the MN 10.
Figure 6B:
FIG. 6B A schematic diagram illustrating a second structure of a data packet, for the first embodiment of the present invention, that the AR 31 transfers to the MN 10.

The structure of a data packet that the AR 31 transfers to the MN 10 is shown in FIGS. 6A and 6B. The packet structure in FIG. 6A is for a packet to be transmitted for the packet transfer destination address of the MN 10, i.e., a packet to be transmitted during the process performed at S213 in FIG. 5. The addresses designated in the outermost header are a destination address, which is a packet transfer destination address for the MN 10; and a source address, which is the IP address of the AR 31. The packet in FIG. 6A is received by the interface 1101 of the MN 10. A packet received by the AR 21 is employed unchanged as a packet encapsulated using this header. That is, this packet is the one encapsulated and transmitted by the AR 21 using a new care-of address for the MN 10, and the internal packet includes a packet for the care-of address used before the MN 10 was moved.

Further, the packet structure in FIG. 6B is for a packet that the AR 31 transfers to the MN 10 upon receiving, from the MN 10, a packet transfer halt instruction message, i.e., a packet to be transmitted during the process performed at S218 in FIG. 5. Since the AR 31 simply performs the normal routing process for a packet transmitted by the AR 21, this packet is exactly the same as the packet transmitted by the AR 21. The packet shown in FIG. 6B is received by the interface 1108 of the MN 10.

In addition, when the AR 31 receives, as a proxy, a packet for the new care-of address for the MN 10, the AR 31 may encapsulate, for a packet transfer destination address, a packet from which the outer header for the new care-of address has been removed, or may encapsulate, for a packet transfer destination address, a packet that has been received from the AR 21 as a proxy, as described above. The MN 10, which has received a packet in either case, performs decapsulation an appropriate number of times to remove the provided capsules, and performs a process for correctly receiving a packet in the decapsulated state.

The above described arrangement can provide the effects that the MN 10 can employ, as a packet transfer destination, an interface other than an interface for which an actual handover is performed, and communication can be continued during a period in which the layer 2 handover is being performed via the interface used for communication. Further, as additional effects, after re-connection of the interface for which the handover was performed has been completed, and when the packet transfer destination has been returned from an interface used as the packet transfer destination to the interface for which re-connection has been completed, the MN 10 can perform communication using the same interface as was used before the handover was performed. Furthermore, as further effects, when the AR 31 changes the packet transfer destination for the MN 10, the load imposed on the AR 21 can be reduced.

It should be noted that in the first embodiment of the present invention, the MN 10 can employ a BU message of a mobile IP, instead of an FBU message, to include information for transmission. In this case, one HA available for the MN 10 serves the same role as does the AR 21, and processes a BU message received from the MN 10. At this time, it is preferable that the MN 10 include, in the BU message, not only a new care-of address and a transfer destination address, but also a home address, managed by a different HA, as a destination address for the transfer of a packet that is received, as a proxy, by the HA that has received the BU message. In this case, this different HA serves to perform the same function as the AR 31, and transfers to the transfer destination address a packet received as a proxy. Further, when a packet transfer halt instruction message is received from the MN 10, a transfer to a transfer destination address is changed to a transfer to a new care-of address.

Second Embodiment

Next, the second embodiment of the present invention will be described. Since the configuration of a radio communication system according to this embodiment is the same as the configuration illustrated in FIG. 1, no further explanation for it will be given.

FIG. 7 is a block diagram illustrating an example arrangement for an MN 10 according to the present invention. The MN 10 in FIG. 7 includes: an interface 1401, an interface 1408, a transmitter 1402, a transmitter 1409, a receiver 1403, a receiver 1410, a packet converter 1404, a packet restoration unit 1405, an MIP processor 1406, an upper layer 1407, an FBU generator 1411, a packet transfer destination address selector 1412, a packet transfer destination change instruction message generator 1413, a linked state monitoring unit 1414, an FBAck receiver 1415 and an FBU entry holding unit 1416.

It should be noted that the interface 1401, the interface 1408, the transmitter 1402, the transmitter 1409, the receiver 1403, the receiver 1410, the packet converter 1404, the packet restoration unit 1405, the MIP processor 1406, the upper layer 1407, the FBU generator 1411, the packet transfer destination address selector 1412, the linked state monitoring unit 1414, the FBAck receiver 1415 and the FBU entry holding unit 1416 are the same as the interface 1101, the interface 1108, the transmitter 1102, the transmitter 1109, the receiver 1103, the receiver 1110, the packet converter 1104, the packet restoration unit 1105, the MIP processor 1106, the upper layer 1107, the FBU generator 1111, the packet transfer destination address selector 1112, the linked state monitoring unit 1114, the FBAck processor 1115 and the FBU entry holding unit 1116 shown in FIG. 2.

When the packet transfer destination change instruction message generator 1413 is aware, based on information received from the linked state monitoring unit 1414, that a connection to the subnet 34 at the moving destination has been completed for the interface for which the handover was performed using the FMIP, the packet transfer destination change instruction message generator 1413 employs information stored in the FBU entry holding unit 1416 and generates a transfer destination change instruction message, requesting that an AR 21 change a transfer destination address from an address that was selected by the packet transfer destination address selector 1412 to an address that is allocated to the interface 1408, for which the handover has been completed. Then, the packet transfer destination change instruction message generator 1413 transmits this message to the transmitter 1409 to request the transmission of the message to the AR 21.

Figure 8:
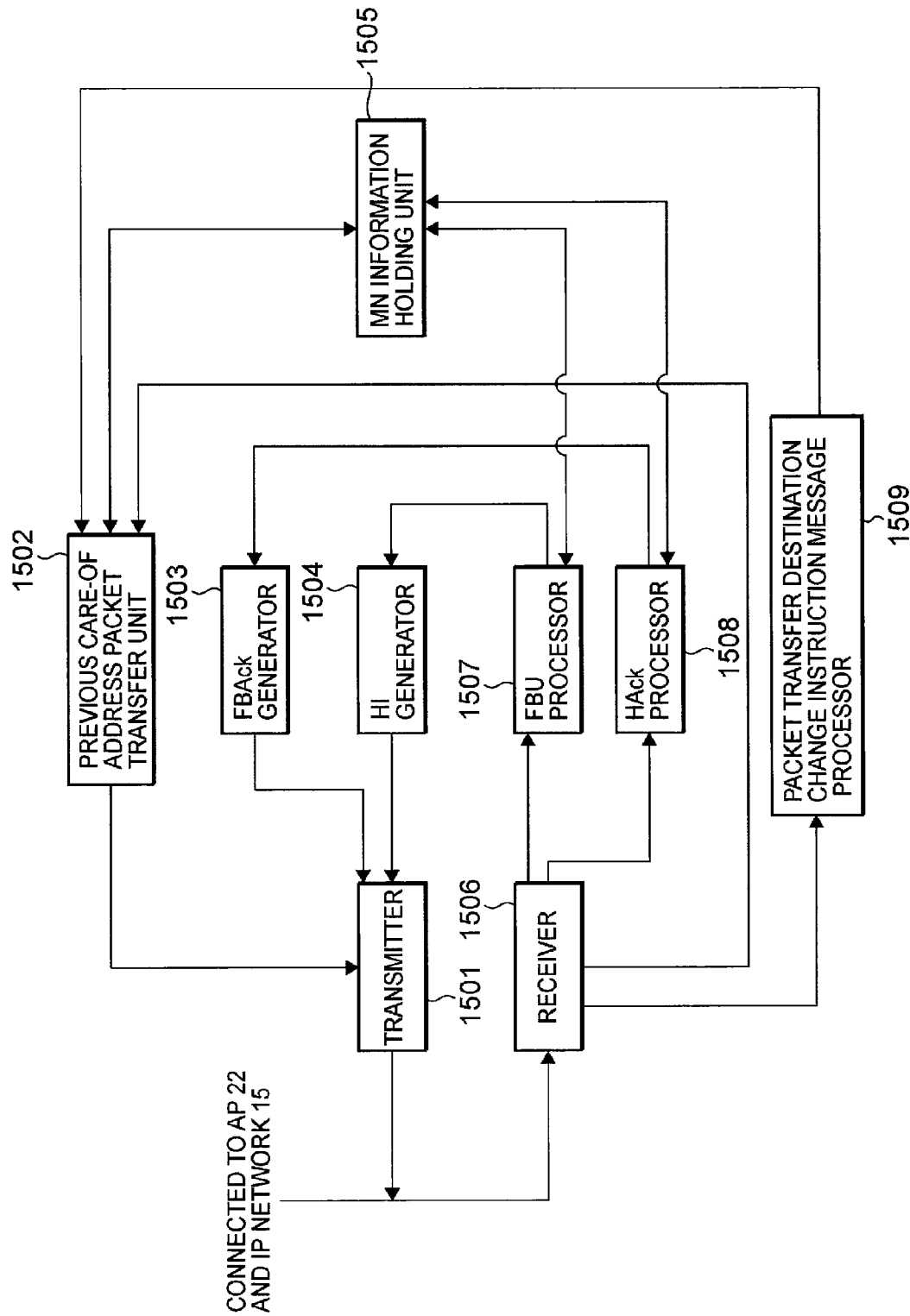
FIG. 8 A block diagram illustrating the arrangement of an access router AR 21 according to the second embodiment of the present invention.

FIG. 8 is a block diagram illustrating an example arrangement for the AR 21 according to the present invention. The AR 21 in FIG. 8 includes: a transmitter 1501, a receiver 1506, a previous care-of address packet transfer unit 1502, an FBAck generator 1503, an HI generator 1504, an MN information holding unit 1505, an FBU processor 1507, an HAck processor 1508 and a packet transfer destination change instruction message processor 1509.

It should be noted that the transmitter 1501 and the receiver 1506 are the same as the transmitter 1201 and the receiver 1204 in FIG. 3.

The previous care-of address packet transfer unit 1502 encapsulates, for a packet transfer address for the MN held in the MN information holding unit 1505, a packet that is received by the receiver 1506 for the care-of address (previous care-of address) used before the MN was moved, and transmits the encapsulated packet to the transmitter 1501 to instruct the transmission of the packet. Further, upon receiving an instruction from the packet transfer destination change instruction message processor 1509, the previous care-of address packet transfer unit 1502 changes a transfer destination of a packet for the previous care-of address for the MN from a packet transfer destination address to a new care-of address, encapsulates the packet for the new care-of address, and transmits the packet to the transmitter 1501 to instruct the transmission of the packet.

The FBAck generator 1503 receives an instruction from the HAck processor 1508, generates a normal FBAck message, and additionally provides information indicating the AR 21 is compatible with a packet transfer, and transmits the resultant message to the transmitter 1501 to instruct the transmission of the message.

The HI generator 1504 receives an instruction from the FBU processor 1507, generates a normal HI message based on information that is included in an FBU message received from the MN 10, and transmits the HI message to the transmitter 1501 to instruct the transmission of the message.

The MN information holding unit 1505 receives instructions from the FBU processor 1507 and the HAck processor 1508, and stores information included in the FBU message received from the MN 10 and information that is provided by the AR 31 and is included in the HAck message.

The FBU processor 1507 performs a process related to the FBU message received from the MN 10, obtains a new care-of address for the MN 10 and a packet transfer destination address that are included in the message, and transmits these addresses to the MN information holding unit 1505 to instruct their storage.

The HAck processor 1508 performs a process related to an HAck message received from the AR 31, obtains information that is provided by the AR 31 and included in the HAck message, and transmits this information to the MN information MN holding unit 1505 to instruct its storage. Furthermore, the HAck processor 1508 instructs the FBAck generator 1503 to generate an FBAck message for transmitting, to the MN 10, the information provided by the AR 31.

The packet transfer destination change instruction message processor 1509 performs a process related to a packet transfer destination change instruction message received from the MN 10, and instructs the previous care-of address packet transfer unit 1502 to change the transfer destination of a packet for the previous care-of address from that packet transfer destination address to a new care-of address for the MN 10.

Figure 9:
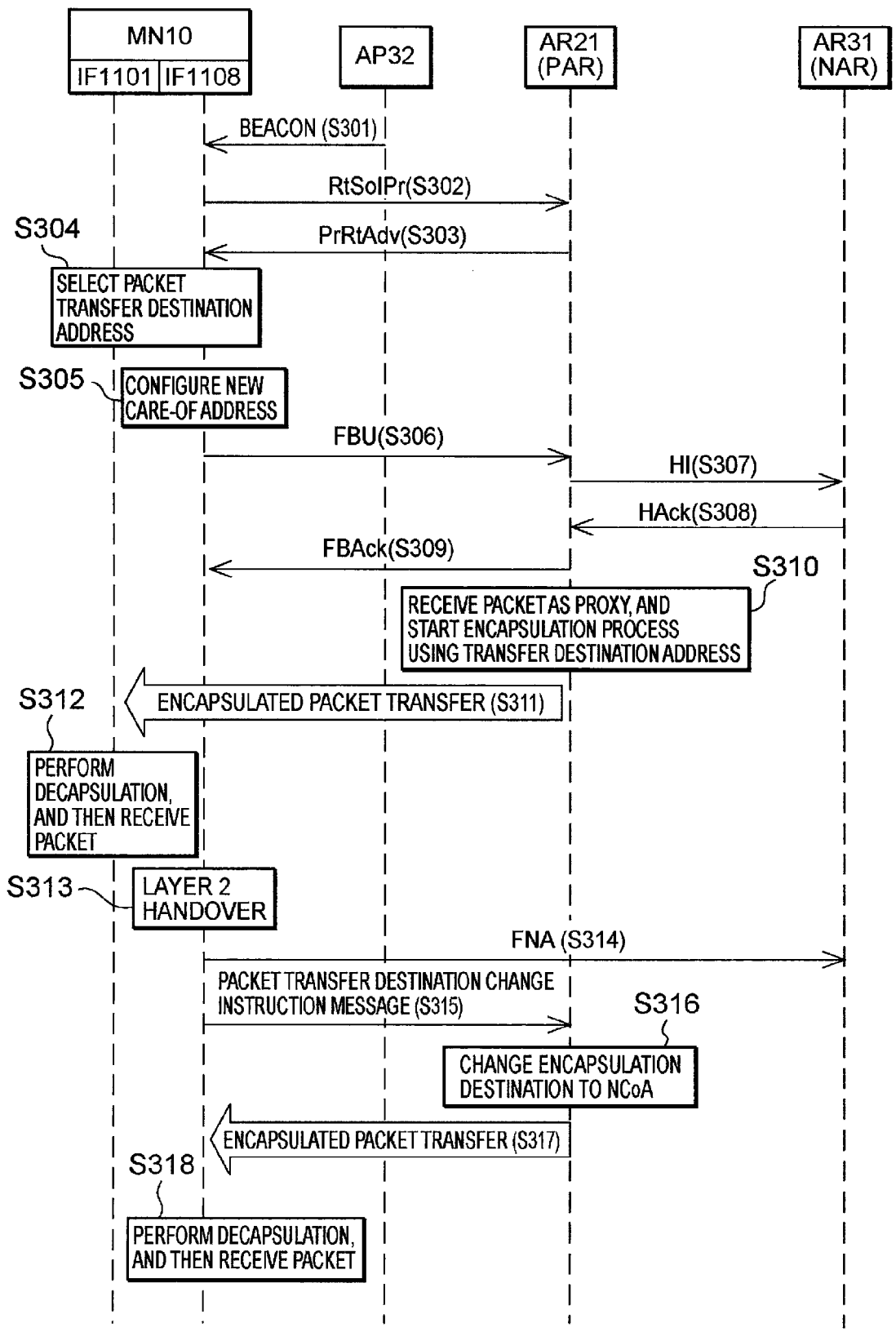
FIG. 9 A sequence chart illustrating the main processing performed by a radio communication system according to the second embodiment of the present invention.

FIG. 9 is a sequence chart showing the main processing for the present invention. Since the process by which the MN 10 receives a beacon from the AP 32 (S301) and transmits an RtSolPr message (S302) until the MN receives a PrRtAdv message (S303) is the same as the normal FMIP process, no further explanation will be given.

When a handover to the AR 31 has been determined, the MN 10 selects, as an appropriate packet transfer destination, one interface (in this case, the interface 1101) from among a plurality of interfaces that are included in the MN 10 and that are in the currently connected state to enable transmission/reception of packets, and selects, as a packet transfer destination address, an address allocated to the selected interface (S304). Furthermore, a new care-of address is configured by using the prefix of the AR 31 obtained at S303 (S305). Then, an FBU message is generated that includes the selected packet transfer destination address and the selected new care-of address, and is transmitted to the AR 21 (S306).

Upon receiving the FBU message, the AR 21 employs information in the message to generate a normal HI message, and transmits the HI message to the AR 31 (S307).

Upon receiving the HI message, the AR 31 investigates the appropriateness of a new care-of address included in the message, and transmits to the AR 21 a normal HAck message that includes the investigation results (S308).

Upon receiving the HAck message, the AR 21 generates an FBAck message by adding, to the normal FBAck message, information indicating that the AR 21 is compatible with the change in the packet transfer destination, and transmits the message to the MN 10 (S309). After the AR 21 has transmitted the FBAck, the AR 21 receives, as a proxy, a packet transmitted to the care-of address used before the MN was moved, and starts an encapsulation process for the packet employing the packet transfer destination address of the MN 10 (S310). It should be noted that, for this capsulation, a packet for the PCoA may be capsulated directly for the transfer destination address, or a packet for the PCoA may be encapsulated first for the NCoA and then encapsulated for a transfer destination address. Then, the encapsulated packet is transmitted to the MN 10 (S311).

The MN 10 receives, via the interface 1101, the encapsulated packet transmitted by the AR 21, and decapsulates the packet to receive the internal packet (S312). During this processing, in consonance with the encapsulation method at S310, either the outer header for the transfer destination address is decapsulated to receive a packet for the PCoA or the outer header for a transfer destination address is decapsulated, and the packet for the NCoA is further decapsulated to receive a packet for the PCoA.

On the other hand, after the layer 2 handover has been performed for the interface 1108 of the MN 10 (S313), the MN 10 transmits an FNA message to the AR 31 at a connection destination (S314), and transmits a packet transfer destination change instruction message to the AR 21, which is an access router used before moving (S315). It should be noted that this packet transfer destination change instruction message reaches the AR 21 through the AR 31, which is newly connected via the interface 1108, or an AR that is connected to the other interface 1101.

When the AR 21 has received a transfer destination change message from the MN 10, the AR 21 changes the packet transfer destination from the packet transfer destination address for the MN 10 to a new care-of address NCoA (S316). As a result, a packet is transferred to the new care-of address for the MN 10 (S317), and the MN 10 employs the interface 1108 to receive a packet.

The MN 10 decapsulates a packet for the new care-of address that is received from the AR 21 via the interface 1108, and receives the internal packet (S318).

The structures of data packets that the AR 21 transfers to the MN 10 are shown in FIGS. 10A and 10B. The packet structure in FIG. 10A is for a packet to be transmitted for the packet transfer destination address for the MN 10, i.e., a packet to be transmitted during the process at S311 in FIG. 9. The addresses designated in the outermost header are a destination address that is a packet transfer destination address for the MN 10; and a source address that is the IP address of the AR 21. A packet received by the AR 21 is employed unchanged as a packet encapsulated using this header. The packet shown in FIG. 10A is received using the interface 1101 of the MN 10.

Further, the packet structure in FIG. 10B is for a packet that the AR 21 transfers to the MN 10 upon receiving, from the MN 10, a packet transfer destination change instruction message, i.e., a packet to be transmitted during the process at S317 in FIG. 9. The packet shown in FIG. 10B is received by the interface 1108 of the MN 10.

In addition, when the AR 21 receives, as a proxy, a packet for the care-of address used before the MN 10 was moved, the AR 21 may employ a packet transfer destination address and encapsulate a packet for the care-of address used before moving, or may encapsulate, for a packet transfer destination address, a packet that has been encapsulated using a new care-of address. The MN 10, which has received a packet in either case, performs decapsulation, the appropriate number of times to remove provided capsules, and performs a process for correctly receiving a packet in the decapsulated state.

The above described arrangement can provide the effects that the MN 10 can employ, as a packet transfer destination, an interface other than an interface for which the actual handover is performed, and that communication can be continued during a period in which the layer 2 handover is performed via the interface used for communication. Further, as additional effects, after re-connection of the interface for which the handover was performed is completed, and when the packet transfer destination is returned, by an interface used as the packet transfer destination for the interface for which a re-connection has been completed, the MN 10 can perform communication using the same interface as was used before the handover was performed. Furthermore, according to this arrangement, since the AR 21 performs a packet transfer and changes the packet transfer destination, the effect, a reduction in the load imposed on the NAR 31, which is the moving destination of the MN 10, can be obtained.

It should be noted that in the second embodiment of the present invention, the MN 10 can employ a BU message from a mobile IP, instead of an FBU message, to include information for transmission. In this case, an HA serves the same role as does the AR 21, and processes a BU message received from the MN 10.

Third Embodiment

Next, the third embodiment of the present invention will be described. Since the configuration of a radio communication system according to this embodiment is the same as the configuration illustrated in FIG. 1, no further explanation for it will be given.

Figure 11:
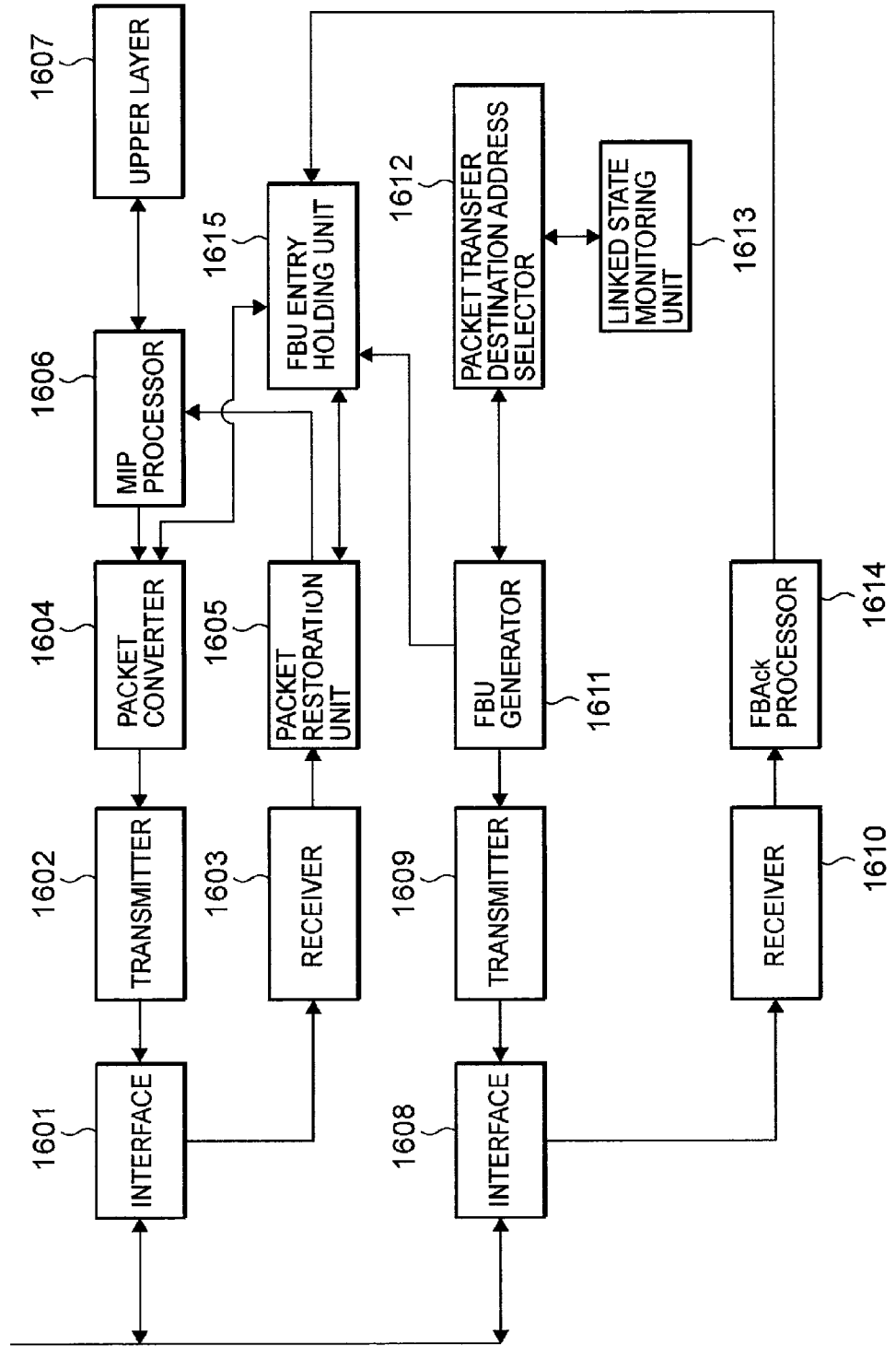
FIG. 11 A block diagram illustrating the arrangement of a mobile communication apparatus MN 10 according to third embodiment of the present invention.

FIG. 11 is a block diagram illustrating an example arrangement for an MN 10 according to the present invention. The MN 10 in FIG. 11 includes: an interface 1601, an interface 1608, a transmitter 1602, a transmitter 1609, a receiver 1603, a receiver 1610, a packet converter 1604, a packet restoration unit 1605, an MIP processor 1606, an upper layer 1607, an FBU generator 1611, a packet transfer destination address selector 1612, a linked state monitoring unit 1613, an FBAck processor 1614 and an FBU entry holding unit 1615.

It should be noted that the interface 1601, the interface 1608, the transmitter 1602, the transmitter 1609, the receiver 1603, the receiver 1610, the packet converter 1604, the packet restoration unit 1605, the MIP processor 1606, the upper layer 1607, the packet transfer destination address selector 1612, the linked state monitoring unit 1613, the FBAck processor 1614 and the FBU entry holding unit 1615 are the same as the interface 1101, the interface 1108, the transmitter 1102, the transmitter 1109, the receiver 1103, the receiver 1110, the packet converter 1104, the packet restoration unit 1105, the MIP processor 1106, the upper layer 1107, the packet transfer destination address selector 1112, the linked state monitoring unit 1114, the FBAck processor 1115 and the FBU entry holding unit 1116 shown in FIG. 2.

The FBU generator 1611 employs a packet transfer destination address, transmitted by the packet transfer destination address selector 1612, that is regarded as the equivalent of a new care-of address in a normal FBU message; generates an FBU message by adding information indicating that the packet transfer destination address is an address allocated to the interface that is currently connected; and transmits the FBU message to the transmitter 1609 to request the transmission of this message to the AR 21. Further, the FBU generator 1611 requests that the FBU entry holding unit 1615 store information that is included in the transmitted FBU message. In a case indicating that the address is allocated to the currently connected interface, this may be indicated using a difference in types of options that include a transfer destination address to be transmitted, or a difference in the field of the same option as used for the transmission of the normal care-of address. For example, an Alternate CoA Option that is one of the mobility options can be employed to represent a normal care-of address, and a mobility option of a new type can be employed to represent a transfer destination address that is an address allocated for the currently connected interface.

Figure 12:
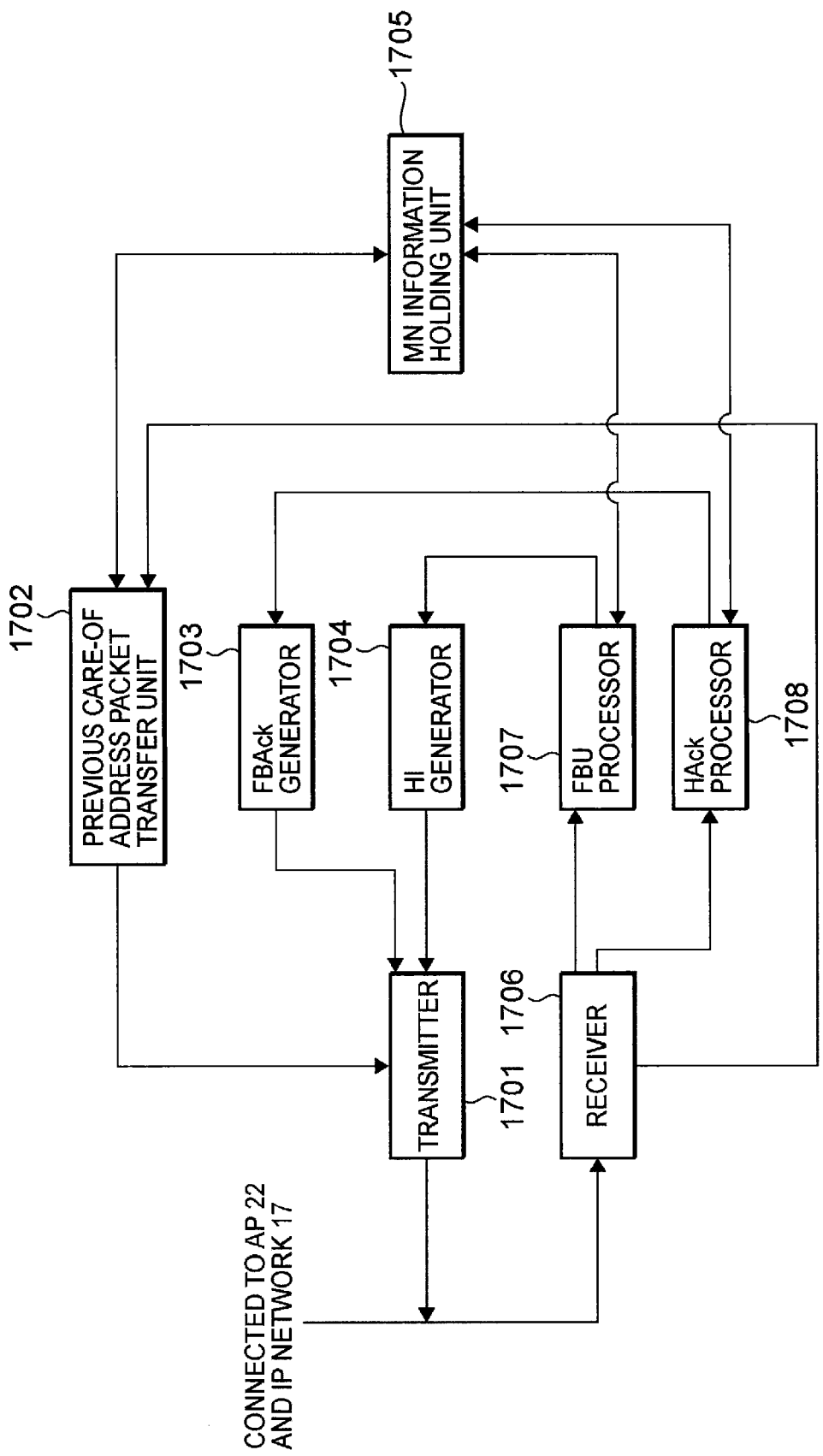
FIG. 12 A block diagram illustrating the arrangement of an access router AR 21 according to mode 3 of the present invention.

FIG. 12 is a block diagram illustrating an example arrangement for the AR 21 according to the present invention. The AR 21 in FIG. 12 includes: a transmitter 1701, a receiver 1706, a previous care-of address packet transfer unit 1702, an FBAck generator 1703, an HI generator 1704, an MN information holding unit 1705, an FBU processor 1707 and an HAck processor 1708.

It should be noted that the transmitter 1701, the receiver 1706, the FBAck generator 1703, the HI generator 1704 and the HAck processor 1708 are the same as the transmitter 1501, the receiver 1506, the FBAck generator 1503, the HI generator 1504 and the HAck processor 1508 in FIG. 8.

The previous care-of address packet transfer unit 1702 encapsulates, for a packet transfer address for the MN held in the MN information holding unit 1705, a packet that is received by the receiver 1706 for the care-of address (the previous care-of address) used before the MN was moved, and transmits the encapsulated packet to the transmitter 1701 to instruct the transmission of this packet.

The MN information holding unit 1705 receives instructions from the FBU processor 1707 and the HAck processor 1708, and stores information included in the FBU message received from the MN 10 and information that is provided by the AR 31 and is included in the HAck message.

The FBU processor 1707 performs a process related to the FBU message received from the MN 10, obtains, from the FBU message, a packet transfer destination address for the MN 10, and information indicating that this address is an address allocated to the other currently connected interface of the MN 10, and transmits the address and the information to the MN information holding unit 1705 to instruct their storage.

At this time, the FBU information includes the information that the address is the one allocated to the currently connected interface of the MN, and in a case wherein it is found that, based on this information, the address is an address allocated to the currently connected interface of the MN, the FBU processor 1707 does not instruct the HI generator 1704 to generate an HI message. On the other hand, in a case wherein the FBU is a normal FMIP FBU message that does not include information indicating that the address is an address allocated to the currently connected interface of the MN, an instruction is issued to the HI generator 1704 to generate a normal FMIP HI message.

Furthermore, the HAck processor 1708 instructs the FBAck generator 1703 to generate an FBAck message in order to transmit, to the MN 10, information provided by the AR 31.

Figure 13:
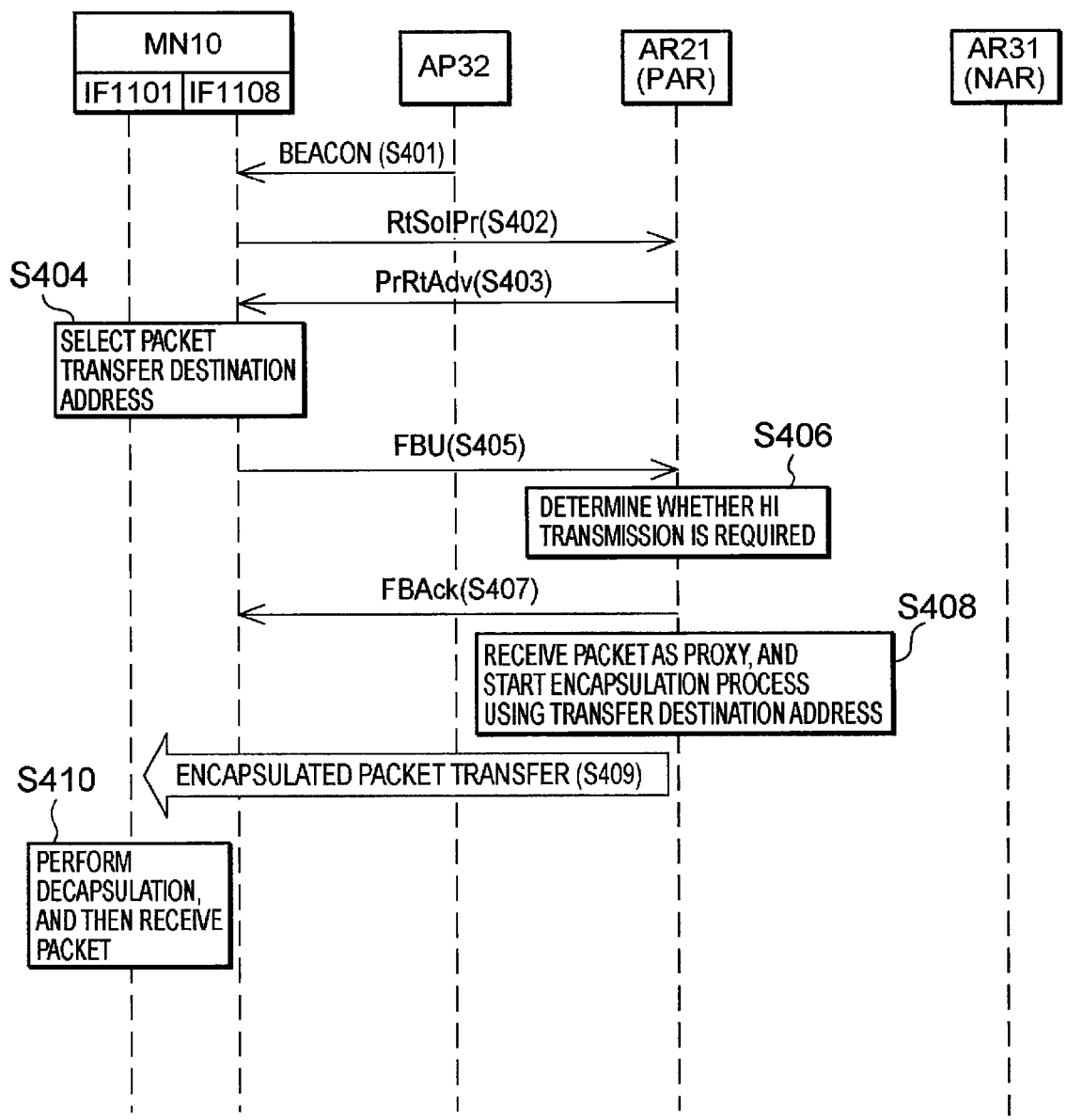
FIG. 13 A sequence chart illustrating the main processing performed by a radio communication system according to third embodiment of the present invention.

FIG. 13 is a sequence chart showing the main processing performed by a radio communication system for the present invention. Since the process from which the MN 10 receives a beacon from the AP 32 (S401) and transmits an RtSolPr message (S402) until the MN receives a PrRtAdv message (S403) is the same as the normal FMIP process, no further explanation will be given. It should be noted that, in this embodiment, the transmission and reception of this RtSolPr message and a PrRtAdv message are arbitrary performed, and are not required.

When the MN 10 recognizes that a handover for the interface 1108 to the AR 31 is to be performed, or the connection to the AR 21 is about to be disconnected, the MN 10 selects, as an appropriate packet transfer destination, one interface (in this case, the interface 1101) from among a plurality of interfaces that are included in the MN 10 and that are in a currently connected state to enable transmission/reception of packets, and selects, as a packet transfer destination address, an address allocated to the selected interface (S404). Then, an FBU message that includes the selected packet transfer destination address is generated, and is transmitted to the AR 21 (S405).

Upon receiving the FBU message from the MN 10, the AR 21 determines whether the address included in the FBU message is an address allocated to the currently connected interface of the MN 10 (S406). In a case wherein, as a result, it is found that the address is an address allocated to the currently connected interface of the MN 10, an FBAck message, which additionally includes information that the AR 21 is compatible with a packet transfer to the currently connected interface, is transmitted to the MN 10, instead of transmitting an HI message to the AR 31 (S407). And after transmitting the FBAck message, the AR 21 receives, as a proxy, a packet for the address used on the subnet 24 of the MN 10, and starts a process for encapsulating this packet for the packet transfer destination address of the MN 10, and for transmitting the encapsulated packet (S408) Then, the encapsulated packet is transmitted to the MN 10 (S409).

The MN 10 receives, via the interface 1101, the encapsulated packet transmitted by the AR 21, and decapsulates the packet to receive the internal packet (S410). Although not shown in FIG. 13, as well as in the above described second embodiment of the present invention, after the layer 2 handover has been performed for the interface 1108 of the MN 10, a packet transfer destination change instruction message may be transmitted to the AR 21 that is an access router used before moving. Thus, the interface 1108 can be employed again to receive a packet.

The above described arrangement can provide the effects that the MN 10 can employ, as a packet transfer destination, an interface other than an interface for which the actual handover is performed, and that communication can be continued during a period in which the layer 2 handover is performed via the interface used for communication. Further, as new effects that are obtained, since the AR 21 can identify that the address included in the FBU message received from the MN 10 is an address allocated to the other interface of the MN 10, and that the interface having this address is currently connected, the AR 21 can determine that transmission of an HI message is not required. It should be noted that in the third embodiment of the present invention the MN 10 can employ a BU message for a mobile IP, instead of an FBU message, to include information for transmission. In this case, an HA serves the same role as the AR 21, and processes a BU message received from the MN 10.

It should be noted that the individual functional blocks employed for the explanation of the individual embodiments of the present invention are obtained typically as LSI (Large Scale Integration) integrated circuits. These may be formed as individual chips, or may be formed as a single chip so as to cover part or all of them. It should be noted that an LSI is employed here, but depending on differences in the integration density, this may also be called an IC (Integrated Circuit), a system LSI, a super LSI or an ultra LSI.

Additionally, the integrated circuit formation method is not limited to the LSI, but is also applicable to a dedicated circuit or a general-purpose processor that may be employed. An FPGA (Field Programmable Gate Array) that is programmable after an LSI is produced, or a reconfigurable processor, for which the connection and the setup of a circuit cell inside an LSI is reconfigurable, may also be employed.

Moreover, when an integrated circuit technology that is employed in an LSI has appeared as a result of the development of semiconductor technology or another derivative technology, naturally, integration of the functional blocks may be performed using this technology. For example, it is possible that biotechnology may be adapted for use.

INDUSTRIAL APPLICABILITY

The present invention provides effects that, when a mobile communication apparatus performs handovers, the mobile communication apparatus effectively utilizes a plurality of its own interfaces to improve the communication efficiency of the mobile communication apparatus, and can be applied for a network technique that includes a mobile communication apparatus, such as a mobile node, especially for a communication control technique whereby a mobile communication apparatus performs handovers between subnetworks using a mobility support technique, such as the FMIP.

The invention claimed is:

1. A communication handover method, which is to be performed when, in a communication system wherein a first access router, which belongs to a first subnet, a second access router, which belongs to a second subnet that is different from the first subnet, and a third access router, which belongs to a third subnet that is different from the first and the second subnets, are connected via an IP network, a mobile terminal, which has a plurality of interfaces and which is connected, via radio communication, to the first subnet using a first interface and is connected to the third subnet using a second interface, switches a connection from the first subnet to the second subnet, comprising the steps of:

the mobile terminal transmitting, to the first access router, an FBU, Fast Binding Update, message that includes not only address information to be used on the first subnet but also packet transfer destination address information allocated for the second interface;

the first access router transmitting, to the second access router, a packet transfer destination address notification message that includes the packet transfer destination address information that is included in the FBU message;

the second access router storing the packet transfer destination address information for the mobile terminal that is included in the packet transfer destination address notification message;

the first access router receiving, as a proxy, a packet addressed to the first subnet of the mobile terminal, and encapsulating the packet and transmitting the encapsulated packet to an address to be used on the second subnet of the mobile terminal;

the second access router receiving, as a proxy, the encapsulated packet that is transmitted by the first access router to the address to be used on the second subnet of the mobile terminal, and encapsulating the packet and transmitting the encapsulated packet to a packet transfer destination address of the mobile terminal;

the mobile terminal receiving, via the second interface, the encapsulated packet that is transmitted by the second access router to the packet transfer destination address of the mobile terminal;

when a connection to the second access router using the first interface has been completed, the mobile terminal transmitting a packet transfer halt instruction message to request that packet transfers to the second access router be halted; and upon receiving the packet transfer halt instruction message, the second access router halting encapsulation and transmission to the packet transfer destination address of the mobile terminal.

2. The communication handover method according to claim 1, comprising the steps of:

the second access router transmitting, to the first access router, a packet transfer destination notification reply message that the second access router is compatible with a packet transfer to an address that is transmitted using the packet transfer destination address notification message; and the first access router transmitting to the mobile terminal information, together with in another message, that is included in the packet transfer destination notification reply message and that indicates the second access router is compatible with the packet transfer.

3. The communication handover method according to claim 2, wherein the another message is a Fast Binding Acknowledgment message.

4. The communication handover method according to claim 1, wherein the packet transfer destination address notification message transmitted by the first access router is another message.

5. The communication handover method according to claim 4, wherein the another message is a Handover initiate message.

6. A communication handover method, which is to be performed when, in a communication system wherein a first access router, which belongs to a first subnet, a second access router, which belongs to a second subnet that is different from the first subnet, and a third access router, which belongs to a third subnet that is different from the first and the second subnets, are connected via an IP network, a mobile terminal, which has a plurality of interfaces and which is connected, via radio communication, to the first subnet using a first interface and is connected to the third subnet using a second interface, switches a connection from the first subnet to the second subnet, comprising the steps of:
 the mobile terminal transmitting, to the first access router, an FBU message that includes not only address information to be used on the first subnet, but also packet transfer destination address information allocated for the second interface;
 the first access router storing the packet transfer destination address information for the mobile terminal that is included in the FBU message;
 the first access router transmitting, to the mobile terminal, the FBAck, Fast Binding Acknowledgment, message indicating that an address to be used on the second subnet is valid;
 the first access router receiving, as a proxy, a packet transmitted to an address on the first subnet of the mobile terminal, and encapsulating the received packet and transmitting the encapsulated packet to the packet transfer destination address of the mobile terminal;
 the mobile terminal receiving, via the second interface, the encapsulated packet that has been transmitted by the first access router to the packet transfer destination address of the mobile terminal;
 when a connection to the second access router using the first interface is completed, the mobile terminal transmitting, to the first access router, a packet transfer destination change instruction message requesting that the packet transfer destination be changed to an address used on the second subnet; and
 upon receiving the packet transfer destination change instruction message, the first access router changing the packet transfer destination of the mobile terminal for encapsulation to the address that the mobile terminal uses on the second subnet.

7. The communication handover method according to claim 6, comprising the steps of:
 the first access router transmitting to the second access router a first other message that includes an address, included in the FBU message, that is to be used on the second subnet of the mobile terminal; and
 the second access router verifying the validity of the address, included in the third message, that is to be used on the second subnet of the mobile terminal, and then transmitting to the first access router a second other message indicating that the address information is valid.

8. The communication handover method according to claim 7, wherein the first other message is a Handover initiate message and the second other message is a Handover Acknowledgement message.

9. A communication message processing method, which is to be performed by a mobile terminal when, in a communication system wherein a first access router, which belongs to a first subnet, a second access router, which belongs to a second subnet that is different from the first subnet, and a third access router, which belongs to a third subnet that is different from the first and the second subnets, are connected via an IP network, the mobile terminal, which has a plurality of interfaces and which is connected, via radio communication, to the first subnet using a first interface and is connected to the third subnet using a second interface, switches a connection from the first subnet to the second subnet, comprising the steps of:
 transmitting, to the first access router, an FBU message that includes an address to be used on the second subnet and, as a packet transfer destination address, an address pack used on the third subnet;
 receiving, from the second access router via the second interface, a packet that is encapsulated for a packet transfer destination address that has been transmitted using the FBU message; and
 when a connection to the second access router using the first interface has been completed, transmitting to the second access router a packet transfer halt instruction message for requesting the halting of a transfer to the packet transfer destination address.

10. The communication message processing method according to claim 9, comprising the steps of:
 receiving, from the first access router, another message that includes information indicating the second access router is compatible with a packet transfer instruction message; and
 storing information, included in the another message, indicating that the second access router is compatible with the packet transfer instruction message.

11. A communication message processing method, which is to be performed by a mobile terminal when, in a communication system wherein a first access router, which belongs to a first subnet, a second access router, which belongs to a second subnet that is different from the first subnet, and a third access router, which belongs to a third subnet that is different from the first and the second subnets, are connected via an IP network, the mobile terminal, which has a plurality of interfaces and which is connected, via radio communication, to the first subnet using a first interface and is connected to the third subnet using a second interface, switches a connection from the first subnet to the second subnet, comprising the steps of:
 transmitting, to the first access router, an FBU message that includes an address to be used on the second subnet and, as a packet transfer destination address, an address pack used on the third subnet;
 receiving, from the first access router via the second interface, a packet that is encapsulated for a packet transfer destination address that has been transmitted using the FBU message; and
 when a connection to the second access router using the first interface has been completed, transmitting to the first access router a packet transfer destination change instruction message for requesting that the packet transfer destination be changed to the address used on the second subnet.

12. The communication message processing method according to claim 11, comprising the steps of:
 receiving, from the first access router, another message that includes information indicating the first access router is compatible with a packet transfer instruction message; and storing information, included in the another message, indicating that the first access router is compatible with the packet transfer instruction message.

13. A communication message processing method, which is to be performed by a first access router when, in a communication system wherein the first access router that belongs to a first subnet, a second access router that belongs to a second subnet, different from the first subnet, and a third access router that belongs to a third subnet, different from the first and the second subnets, are connected via an IP network, a mobile terminal, which has a plurality of interfaces and which is connected, via radio communication, to the first subnet and to the third subnet using different interfaces, switches a connection from the first subnet to the second subnet, comprising the steps of:

receiving, from the mobile terminal, an FBU message that includes an address to be used on the second subnet of the mobile terminal, and, as a packet transfer destination address, an address used on the third subnet;

transmitting, to the second access router, a packet transfer destination notification message that includes address information to be used on the second subnet and packet transfer destination address information for the mobile terminal, both of which have been transmitted in the FBU message;

receiving, as a proxy, a packet for an address on the first subnet of the mobile terminal, encapsulating the packet for an address used on the second subnet of the mobile terminal, and transmitting the packet to the second access router.

14. The communication message processing method according to claim 13, wherein a packet transfer destination notification message that includes the packet transfer destination address information of the mobile terminal, which has been transmitted, using the FBU message, to the second access router, is another message.

15. A communication message processing method, which is to be performed by a first access router when, in a communication system wherein the first access router that belongs to a first subnet, a second access router that belongs to a second subnet, different from the first subnet, and a third access router that belongs to a third subnet, different from the first and the second subnets, are connected via an IP network, a mobile terminal, which has a plurality of interfaces and which is connected, via radio communication, to the first subnet and to the third subnet using different interfaces, switches a connection from the first subnet to the second subnet, comprising the steps of:

receiving, from the mobile terminal, an FBU message that includes an address to be used on the second subnet of the mobile terminal, and, as a packet transfer destination address, an address used on the third subnet;

receiving, as a proxy, a packet for an address on the first subnet of the mobile terminal, encapsulating the packet for the packet transfer destination address of the mobile terminal, and transmitting the packet;

receiving a packet transfer destination change instruction message from the mobile terminal, requesting that a packet transfer destination be changed from a packet transfer destination address that is transmitted using FBU message to an address to be used for the second access router; and after the packet transfer destination change instruction message is received, changing the packet transfer destination to the address for the mobile terminal used for the second access router.

16. A communication message processing method, which is to be performed by a first access router when, in a communication system wherein the first access router that belongs to a first subnet, a second access router that belongs to a second subnet, different from the first subnet, and a third access router that belongs to a third subnet, different from the first and the second subnets, are connected via an IP network, a mobile terminal, which has a plurality of interfaces and which is connected, via radio communication, to the first subnet and to the third subnet using different interfaces, switches a connection from the first subnet to the second subnet, comprising the steps of:

receiving a packet transfer destination address notification message from the first access router;

storing information included in the packet transfer destination address notification message; receiving, as a proxy, a packet that is encapsulated for an address to be used on the second subnet of the mobile terminal and is transmitted, by the first access router, and encapsulating and transmitting the packet for a packet transfer destination address for the mobile terminal; and receiving a packet transfer halt instruction message from the mobile terminal, requesting that a packet transfer be halted to the packet transfer destination address of the mobile terminal.

17. A mobile terminal which has a plurality of interfaces, and which, in a communication system wherein a first access router, which belongs to a first subnet, a second access router, which belongs to a second subnet that is different from the first subnet, and a third access router, which belongs to a third subnet that is different from the first and the second subnets, are connected via an IP network, is connected, via radio communication, to the first subnet using a first interface and is connected to the third subnet using a second interface, and switches a connection from the first subnet to the second subnet, comprising:

means for transmitting, to the first access router, an FBU message that includes an address to be used on the second subnet and, as a packet transfer destination address, an address pack used on the third subnet;

means for receiving, from the second access router via the second interface, a packet that is encapsulated for a packet transfer destination address that has been transmitted using the FBU message; and means for, when a connection to the second access router using the first interface has been completed, transmitting to the second access router a packet transfer halt instruction message for requesting the halting of a transfer to the packet transfer destination address.

18. The mobile terminal according to claim 17, comprising:

means for receiving, from the first access router, another message that includes information indicating the second access router is compatible with a packet transfer instruction message; and means for storing information, included in the another message, indicating that the second access router is compatible with the packet transfer instruction message.

19. A mobile terminal which has a plurality of interfaces, and which in a communication system wherein a first access router, which belongs to a first subnet, a second access router, which belongs to a second subnet that is different from the first subnet, and a third access router, which belongs to a third subnet that is different from the first and the second subnets, are connected via an IP network, is connected, via radio communication, to the first subnet using a first interface and is connected to the third subnet using a second interface, and switches a connection from the first subnet to the second subnet, comprising:

means for transmitting, to the first access router, an FBU message that includes an address to be used on the second subnet and, as a packet transfer destination address, an address pack used on the third subnet;

means for receiving, from the first access router via the second interface, a packet that is encapsulated for a packet transfer destination address that has been transmitted using the FBU message; and means for, when a connection to the second access router using the first interface has been completed, transmitting to the first access router a packet transfer destination change instruction message for requesting that the packet transfer destination be changed to the address used on the second subnet.

20. The mobile terminal according to claim 19, comprising:

means for receiving, from the first access router, another message that includes information indicating the first access router is compatible with a packet transfer instruction message; and means for storing information, included in the another message, indicating that the first access router is compatible with the packet transfer instruction message.

* * * * *